(12) United States Patent
Matsui et al.

(10) Patent No.: US 8,819,270 B2
(45) Date of Patent: Aug. 26, 2014

(54) INFORMATION PROCESSING APPARATUS, COMPUTER-READABLE NON TRANSITORY STORAGE MEDIUM STORING IMAGE TRANSMISSION PROGRAM, AND COMPUTER-READABLE STORAGE MEDIUM STORING IMAGE DISPLAY PROGRAM

(75) Inventors: Kazuki Matsui, Kawasaki (JP); Kenichi Horio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 225 days.

(21) Appl. No.: 13/167,168

(22) Filed: Jun. 23, 2011

(65) Prior Publication Data

US 2011/0258339 A1 Oct. 20, 2011

(30) Foreign Application Priority Data

Jul. 1, 2010 (JP) ................................. 2010-151491

(51) Int. Cl.
*G06F 15/16* (2006.01)

(52) U.S. Cl.
USPC ............................. 709/236; 709/203; 709/217

(58) Field of Classification Search
USPC .................. 709/201–203, 217–218, 231–236
See application file for complete search history.

(56) References Cited

U.S. PATENT DOCUMENTS

| | | |
|---|---|---|
| 2004/0151390 A1 | 8/2004 | Iwamura |
| 2006/0174026 A1 | 8/2006 | Robinson et al. |
| 2007/0268824 A1 | 11/2007 | Kodaka et al. |

FOREIGN PATENT DOCUMENTS

| | | |
|---|---|---|
| GB | 2462179 | 2/2010 |
| JP | 2007-311957 | 11/2007 |
| JP | 2008-527851 | 7/2008 |
| JP | 2009-246415 | 10/2009 |
| WO | 2005/029864 A1 | 3/2005 |

OTHER PUBLICATIONS

Rahman, A.K.M. Ashikur, "Thin Clients Via Shadow Objects", Advanced Communication Technology, 2004, pp. 1072-1077.
Search Report issued by the European Patent Office on Nov. 16, 2011 in the corresponding European patent application No. 11171381.4.
Japanese Office Action mailed Apr. 1, 2014 in corresponding Japanese Application No. 2010-151491.

*Primary Examiner* — Yasin Barqadle
(74) *Attorney, Agent, or Firm* — Staas & Halsey LLP

(57) ABSTRACT

An information processing apparatus for generating a plurality of images to be displayed on a display unit of a terminal device connected via a network and transmitting the plurality of images to the terminal device. The apparatus includes an image memory for storing the plurality of images; a first transmission unit for transmitting the plurality of images to the terminal device, an area determination unit for determining an area in which change between frames of the plurality of images exceeds a threshold value, a second transmission unit for compressing the determined area at a frame rate higher than that of the first transmission unit and transmitting the area to the terminal device, and a management unit for managing synchronization between an image transmitted by the first transmission unit and an image transmitted by the second transmission unit, generating drawing timing of each image.

8 Claims, 15 Drawing Sheets

INFORMATION PROCESSING APPARATUS, COMPUTER-READABLE NON TRANSITORY STORAGE MEDIUM STORING IMAGE TRANSMISSION PROGRAM, AND COMPUTER-READABLE STORAGE MEDIUM STORING IMAGE DISPLAY PROGRAM

CROSS-REFERENCE TO RELATED APPLICATION

This application is based upon and claims the benefit of priority of the prior Japanese Patent Application No. 2010-151491, filed on Jul. 1, 2010, the entire contents of which are incorporated herein by reference.

FIELD

Embodiments disclosed herein relate to an information processing apparatus, an image transmission program, an image display program, and an image display method.

BACKGROUND

A system called "thin client" is known. The thin client system is constructed so that a client has a minimum function and a server manages resources such as applications and files.

While such a thin client system causes the client to display a result of processing performed by the server and data held by the server in actual fact, the client behaves as if the client independently performed processing or held data.

For example, International Publication No. WO 2005/029864 discloses that the thin client system causes the server to perform applications related to business operations such as document creation and email, and causes the client to display the processing results of the applications. In addition to such business applications, it is desired that the thin client system is applied to wider areas such as an application that handles fine images including CAD (Computer-Aided Design) and an application that handles moving images.

However, examples of the protocol used for communication in the thin client system include an RDP (Remote Desktop Protocol) and an RFB (Remote Frame Buffer) protocol used for VNC (Virtual Network Computing). When handling a large amount of data such as images or moving images by these protocols, there is a problem that the response to the operation performed in the client is degraded. Such a problem is common to a case in which a large amount of data transmission occurs between the client and the server in the thin client system when a screen is updated, and the problem is not limited to a case in which images or moving images are handled.

Because of this, as an example of a technique for improving the operation response, the technique described below is proposed. In the technique, the server hooks an output of a specific media application and transmits data handled by the media application to the client. On the other hand, the client reproduces the data handed by the media application that runs on the server.

SUMMARY

In accordance with an aspect of the embodiments, an information processing apparatus for generating a plurality of images to be displayed on a display unit of a terminal device connected via a network and transmitting the plurality of images to the terminal device, the apparatus includes, an image memory for storing the plurality of images; a first transmission unit for transmitting the plurality of images to the terminal device; an area determination unit for determining an area in which change between frames of the plurality of images exceeds a threshold value; a second transmission unit for compressing the determined area at a frame rate higher than that of the first transmission unit and transmitting the area to the terminal device; and a management unit for managing synchronization between an image transmitted by the first transmission unit and an image transmitted by the second transmission unit, generating drawing timing of each image according to detection of a move of the area determined by the area determination unit, and adding the drawing timing to the image transmitted by the first transmission unit and the image transmitted by the second transmission unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

The inventors newly found that the above conventional technique becomes operative only in an environment depending on a specific media application, so there is a problem that the technique reduces general versatility of the thin client.

Specifically, the above conventional technique requires that the media application to be installed in the server or the client is modified or the media application that is modified in advance is preinstalled. However, these days the media applications are obtained in various ways, so media applications that can be modified are limited to only a part of them. Therefore, most media applications need to be used while the operation response is degraded.

Hereinafter, embodiments of an information processing apparatus, an image transmission program, an image display program, and an image display method disclosed by the present application will be described in detail. However, these embodiments in no way limit the disclosed technique.

Figure 1:
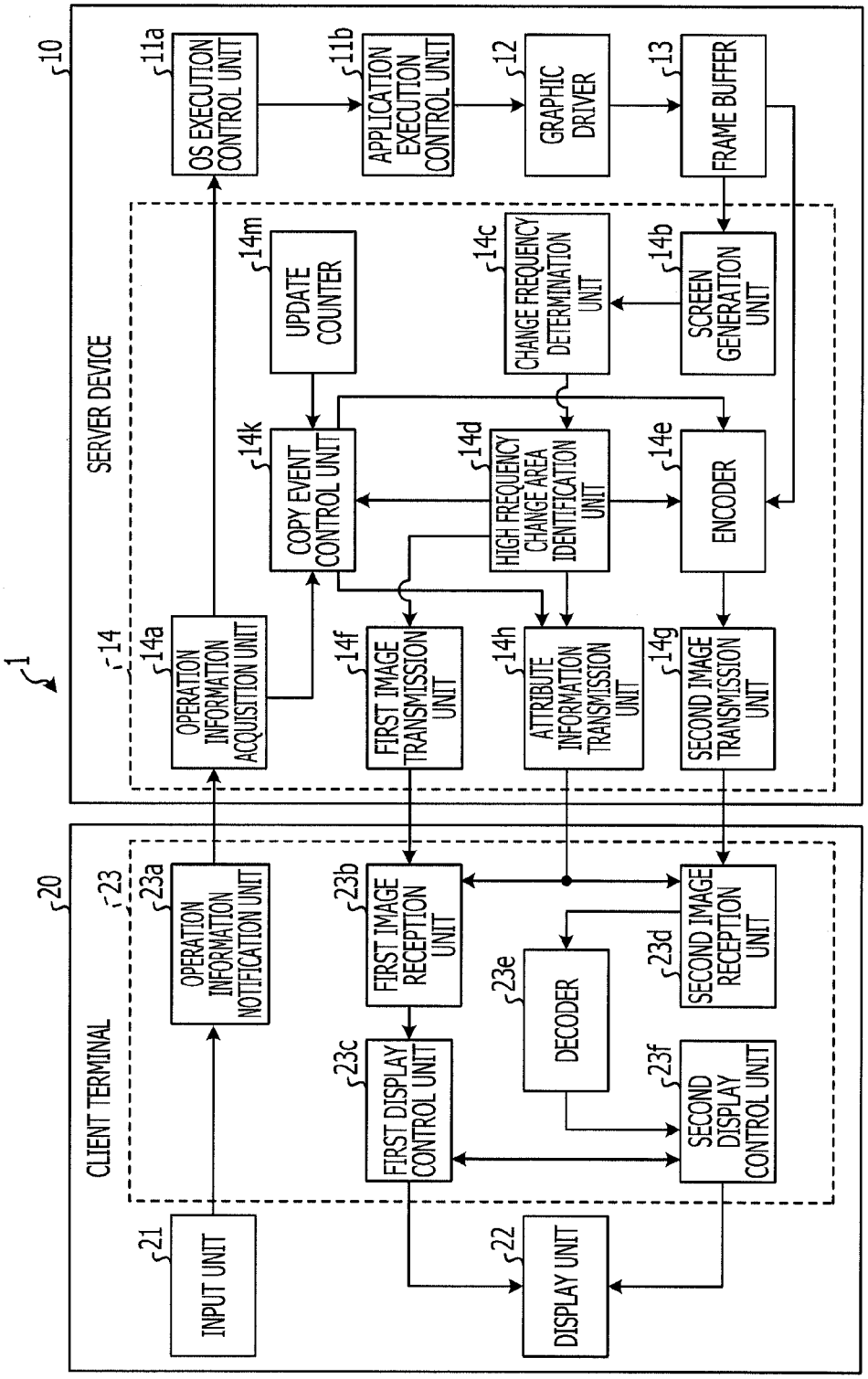
FIG. 1 is a block diagram showing configurations of devices included in a thin client system according to a first embodiment.

First, a thin client system according to a first embodiment will be described. FIG. 1 is a block diagram showing configurations of devices included in the thin client system according to the first embodiment.

The thin client system 1 shown in FIG. 1 causes a server device 10 to remote control a screen displayed by a client terminal 20. In other words, although the thin client system 1 causes the client terminal 20 to display a result of processing performed by the server device 10 and data held by the server device 10 in practice, the client terminal 20 behaves as if the client terminal 20 independently performed processing or held data.

As shown in FIG. 1, the thin client system 1 has the server device 10 and the client terminal 20. The example of FIG. 1 shows a case in which one client terminal is connected to one server device 10. However, an arbitrary number of client terminals can be connected to one server device 10.

The server device 10 and the client terminal 20 are connected to be able to communicate with each other via a predetermined network. Any type of communication network, such as the Internet, LAN (Local Area Network), and VPN (Virtual Private Network) whether they are wired or wireless can be used for the network. It is assumed that, for example, an RFB (Remote Frame Buffer) protocol in VNC is used as the communication protocol between the server device 10 and the client terminal 20.

The server device 10 a computer that provides a service for remote controlling a screen displayed on the client terminal 20. An application for a server to remote control a screen is installed or preinstalled in the server device 10. Hereinafter, the application for a server to remote control a screen is referred to as a server side remote screen control application.

The server side remote screen control application has a function to provide a remote screen control service as a basic function. As an example, the server side remote screen control application obtains operation information of the client terminal 20 and causes an application running on the server to perform processing required by the operation. Then, the server side remote screen control application generates a screen to display a result of the processing performed by the application and transmits the screen to the client terminal 20. At this time, the server side remote screen control application transmits an area which includes pixels changed from the pixels of bitmap image displayed on the client terminal 20 before the screen is generated. In other words, the server side remote screen control application transmits an image of an update rectangle. Hereinafter, as an example, a case will be described in which an image of an updated portion is formed by a rectangle image. However, the disclosed apparatus can be also applied when the image of an updated portion is formed by a shape other than a rectangle.

In addition, the server side remote screen control application has a function to compress data, in which the amount of movement between frames is large, into data of a moving image compression method and transmit the data to the client terminal 20. As an example, the server side remote screen control application divides a screen generated from a result of the processing performed by the application into a plurality of areas and monitors the frequency of changes in each divided area. At this time, the server side remote screen control application transmits attribute information of an area in which the frequency of changes exceeds a threshold value, in other words, attribute information of a high frequency change area, to the client terminal 20. Along with this, the server side remote screen control application encodes a bitmap image of the high frequency change area into data of the MPEG method such as MPEG-2 or MPEG-4 and transmits the data to the client terminal 20. Although, here, a case is illustrated in which data is compressed into data of the MPEG (Moving Picture Experts Group) method, it is not limited to this. For example, when using a moving image compression method, any compression encoding method, for example, Motion-JPEG (Joint Photographic Experts Group) or the like can be used.

The client terminal 20 is a computer that receives a remote screen control service provided by the server device 10. Examples of the client terminal 20 include a fixed terminal such as a personal computer and a mobile terminal such as a mobile phone, a PHS (Personal Handy phone System), and a PDA (Personal Digital Assistant). A remote screen control application for a client is installed or preinstalled in the client terminal 20. Hereinafter, the remote screen control application for a client is referred to as a client side remote screen control application.

The client side remote screen control application has a function to notify the server device 10 of operation information received via various input devices such as a mouse and a keyboard. As an example, the client side remote screen control application notifies a position and a moving amount of a mouse cursor obtained via left or right click of a mouse, double click, drag, and a movement operation of the mouse as the operation information. As another example, the client side remote screen control application notifies a rotation amount of a mouse wheel and a type of a pressed key in the keyboard as the operation information.

Further, the client side remote screen control application has a function to display an image received from the server device 10 on a predetermined display unit. As an example, when the client side remote screen control application receives a bitmap image of an update rectangle from the server device 10, the client side remote screen control application displays the image of the update rectangle at a position in which image is changed from the previous bitmap image. As another example, when the client side remote screen control application receives attribute information of a high frequency change area from the server device 10, the client side remote screen control application defines an area on the display screen corresponding to a position included in the attribute information as a blank area in which bitmap image is not displayed. Thereafter, if the client side remote screen control application receives data of a moving image compression method, the client side remote screen control application decodes the data and displays the decoded data in the blank area.

Next, a configuration of the server device according to this embodiment will be described. As shown in FIG. 1, the server device 10 has an OS execution control unit 11a, an application execution control unit 11b, a graphic driver 12, a frame buffer 13, and a server side remote screen control unit 14. In the example of FIG. 1, the server device 10 also has functional units included an ordinary computer, such as, for example, various input devices and display devices in addition to the functional units shown in FIG. 1.

The OS execution control unit 11a is a processing unit for controlling execution of the OS (Operating System). For example, the OS execution control unit 11a detects a start instruction of an application and a command to an application from operation information obtained by an operation information acquisition unit 14a described below. As an example, when the OS execution control unit 11a detects a double click on an icon of an application, the OS execution control unit 11a instructs an application execution control unit 11b described below to start the application corresponding to the icon. As another example, when the OS execution control unit 11a detects an operation that requests execution of a command on an operation screen, that is, the so-called window of an application in execution, the OS execution control unit 11a instructs the application execution control unit 11b to execute the command.

The application execution control unit 11b is a processing unit for controlling execution of an application on the basis of an instruction from the OS execution control unit 11a. As an example, when the application execution control unit 11b is instructed to start an application by the OS execution control unit 11a or instructed to execute a command by an application in execution, the application execution control unit 11b executes the application or the command. Then, the application execution control unit 11b requests the graphic driver 12 described below to draw a display image of the processing result obtained by executing the application in the frame buffer 13. When the application execution control unit 11b requests the graphic driver 12 to draw the image, the application execution control unit 11b notifies the graphic driver 12 of a drawing position of the display image along with the display image.

An application executed by the application execution control unit 11b may be preinstalled or may be installed after the server device 10 is shipped. Or, the application may be an application that operates in a network environment, such as JAVA (registered trademark).

The graphic driver 12 is a processing unit for executing drawing processing to the frame buffer 13. As an example, when the graphic driver 12 receives a drawing request from the application execution control unit 11b, the graphic driver 12 draws a display image of the processing result of the application in bitmap format at a drawing position on the frame buffer 13 specified by the application. Although, here, a case is described in which the drawing request is received from an application, the drawing request may be received from the OS execution control unit 11a. As an example, when the graphic driver 12 receives a drawing request of the mouse cursor from the OS execution control unit 11a, the graphic driver 12 draws a display image of the mouse cursor in bitmap format at a drawing position on the frame buffer 13 specified by the OS.

The frame buffer 13 is a storage device for storing bitmap data drawn by the graphic driver 12. The frame buffer 13 is, for example, a semiconductor memory device, such as a RAM (Random Access Memory) including VRAM (Video Random Access Memory), a ROM (Read Only Memory), and a flash memory. A storage device such as a hard disk or an optical disk may be used as the frame buffer 13.

The server side remote screen control unit 14 is a processing unit for providing a remote screen control service to the client terminal 20 through the server side remote screen control application. As shown in FIG. 1, the server side remote screen control unit 14 has an operation information acquisition unit 14a, a screen generation unit 14b, a change frequency determination unit 14c, a high frequency change area identification unit 14d, an encoder 14e, a first image transmission unit 14f, and a second image transmission unit 14g. The server side remote screen control unit 14 further has an attribute information transmission unit 14h, a copy event control unit 14k, and an update counter 14m.

The operation information acquisition unit 14a is a processing unit for obtaining operation information from the client terminal 20. Examples of the operation information include a position and a moving amount of a mouse cursor obtained via left or right click of a mouse, double click, drag, and a movement operation of the mouse. Other examples of the operation information include a rotation amount of a mouse wheel and a type of a pressed key in the keyboard.

The screen generation unit 14b is a processing unit for generating a screen displayed on a display unit 22 of the client terminal 20. As an example, each time bitmap data is stored into the frame buffer 13 by the graphic driver 12, the screen generation unit 14b starts the processing described below. The screen generation unit 14b compares a desktop screen displayed by the client terminal 20 when the previous frame is generated with a desktop screen written to the frame buffer 13 when the current frame is generated. Then, the screen generation unit 14b generates an image of an update rectangle by combining pixels of a portion changed from the previous frame and arranging the pixels into a rectangle, and generates a packet for transmitting the update rectangle.

The change frequency determination unit 14c is a processing unit for determining the frequency of changes between frames for each area obtained by dividing the image drawn on the frame buffer 13. As an example, the change frequency determination unit 14c accumulates the update rectangles generated by the screen generation unit 14b in an internal work memory not shown in the drawings for a predetermined period of time. At this time, the change frequency determination unit 14c accumulates attribute information which can specify the position and the size of the update rectangle, such as, for example, the coordinates of the upper left vertex of the update rectangle and the width and height of the update rectangle. The period of time for accumulating the update rectangles correlates with the degree of accuracy for identifying a high frequency change area. The longer the period of time is, the smaller the number of false detections of high frequency change areas is. Here, as an example, a case is assumed in which the images of the update rectangles are accumulated for one second.

At this time, if a predetermined time elapses from when the image of the first update rectangle is accumulated, the change frequency determination unit 14c determines the frequency of changes on the desktop screen by using a map in which the desktop screen displayed by the client terminal 20 is divided into a mesh.

Figure 2:
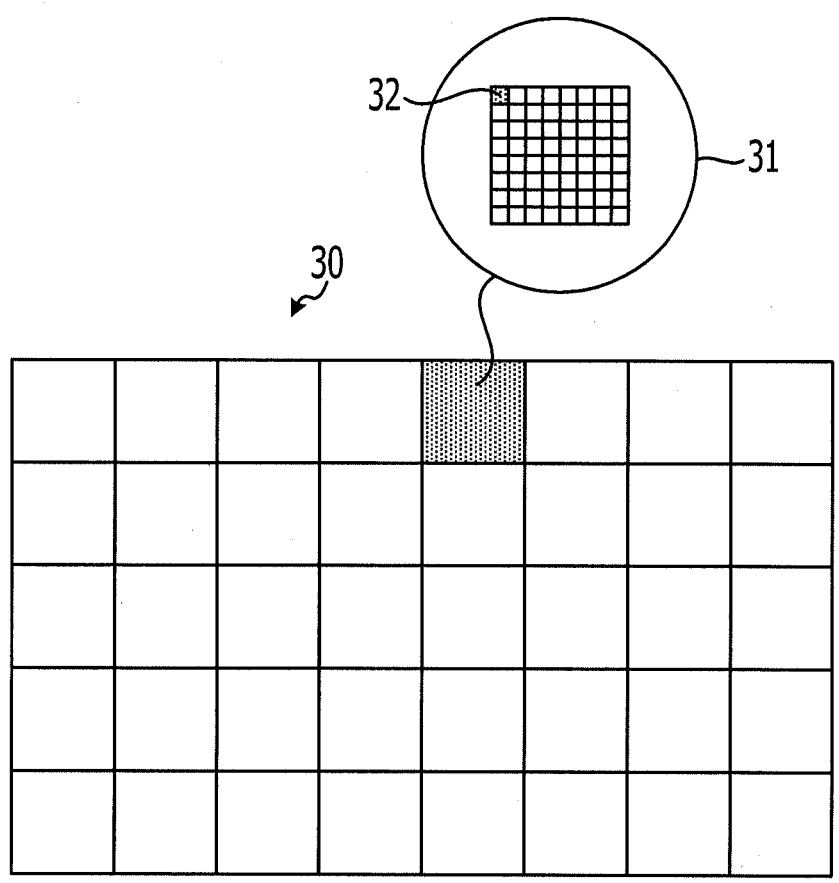
FIG. 2 is a diagram for explaining a method of dividing a desktop screen.

FIG. 2 is a diagram for explaining a method of dividing the desktop screen. Reference numeral 30 shown in FIG. 2 denotes a map for determining the frequency of changes. Reference numeral 31 shown in FIG. 2 denotes a mesh included in the map 30. Reference numeral 32 shown in FIG. 2 denotes a pixel included in a pixel block that forms the mesh 31. In the example shown in FIG. 2, a case is assumed in which the change frequency determination unit 14c divides the pixels included in the map 30 into blocks of 8 pixels×8 pixels, one block of which is defined as one mesh. In this case, one mesh includes 64 pixels.

Here, the change frequency determination unit 14c sequentially arranges the images of the update rectangles on the map for determining the frequency of changes according to the position and the size of the update rectangles accumulated in the internal work memory. Every time the change frequency determination unit 14c arranges the update rectangle on the map, the change frequency determination unit 14c cumulatively increments the number of changes of a mesh that overlaps the update rectangle on the map. At this time, if the update rectangle arranged on the map overlaps a predetermined number of pixels included in a mesh, the change frequency determination unit 14c increments the number of changes of the mesh by one. In the description here, it is assumed that if the update rectangle overlaps at least one pixel included in a mesh, the change frequency determination unit 14c increments the number of changes of the mesh.

Figure 3A:
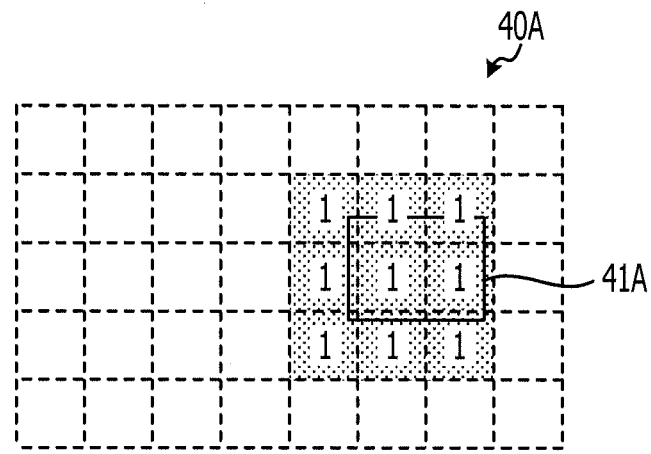
FIG. 3A is a diagram for explaining a method of determining the frequency of changes on the desktop screen.
Figure 3B:
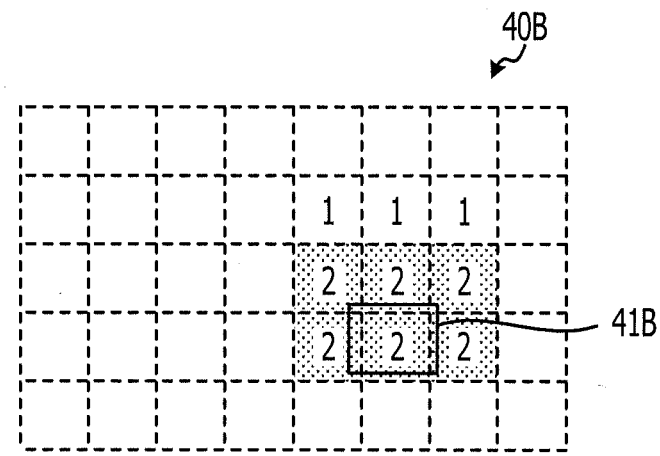
FIG. 3B is a diagram for explaining a method of determining the frequency of changes on the desktop screen.
Figure 3C:
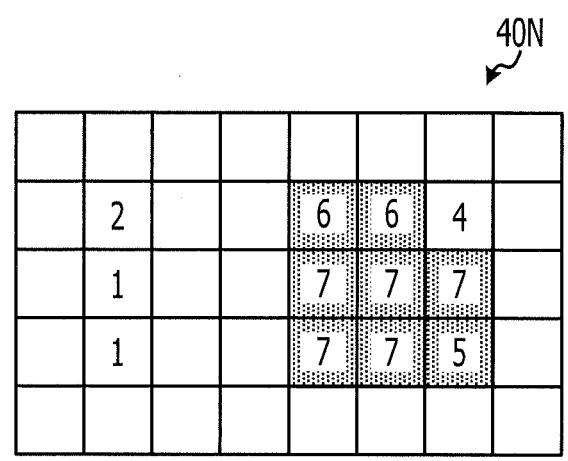
FIG. 3C is a diagram for explaining a method of determining the frequency of changes on the desktop screen.

FIGS. 3A to 3C are diagrams for explaining a method of determining the frequency of changes on the desktop screen. Reference numerals 40A, 40B, and 40N shown in FIGS. 3A to 3C denote a map for determining the frequency of changes. Reference numerals 41A and 41B shown in FIGS. 3A and 3B denote an update rectangle. Here, the numbers shown in meshes in the map 40A are the number of changes of each mesh when the update rectangle 41A is arranged. On the other hand, the numbers shown in meshes in the map 40B are the number of changes of each mesh when the update rectangle 41B is arranged. Further, the numbers shown in meshes in the map 40N are the number of changes of each mesh when all the update rectangles accumulated in the internal work memory are arranged. In FIGS. 3A to 3C, the number of changes of meshes in which no number is shown is zero.

As shown in FIG. 3A, when the update rectangle 41A is arranged on the map 40A, the shaded meshes overlap the update rectangle 41A. Therefore, the change frequency determination unit 14c increments by one the number of updates of each shaded mesh. In this case, the number of changes of each mesh is zero, so the number of changes of the shaded portion is incremented from 0 to 1. Further, as shown in FIG. 3B, when the update rectangle 41B is arranged on the map 40B, the shaded meshes overlap the update rectangle 41B. Therefore, the change frequency determination unit 14c increments by one the number of updates of each shaded mesh. In this case, the number of changes of each mesh is 1, so the number of changes of the shaded portion is incremented from 1 to 2. In this way, when all the update rectangles are arranged on the map, as a result, the map 40N shown in FIG. 3C is obtained.

When the change frequency determination unit 14c has arranged all the update rectangles accumulated in the internal work memory on the map, the change frequency determination unit 14c obtains meshes in which the number of changes in a predetermined period of time, that is, the frequency of changes exceeds a threshold value. In the example of FIG. 3C, if the threshold value is "4", the shaded meshes are obtained. The higher the threshold value is set, the higher the probability that a portion on the desktop screen where a moving image is displayed is encoded by the encoder 14e described below. The aforementioned "threshold value" can be selected by an end user from stepped values set by a developer of the server side remote screen control application, or can be directly set by an end user.

Return to the description of FIG. 1. The high frequency change area identification unit 14d is a processing unit for identifying an area which is changed in a high frequency on the desktop screen displayed by the client terminal 20 as a high frequency change area.

When the meshes in which the number of changes exceeds the threshold value are obtained by the change frequency determination unit 14c, the high frequency change area identification unit 14d corrects a mesh connected body, in which adjacent meshes are connected to each other, into a rectangle. As an example, the high frequency change area identification unit 14d derives an interpolation area that is interpolated in the mesh connected body, and adds the interpolation area to the mesh connected body to correct the mesh connected body into a rectangle. To derive the interpolation area, an algorithm is used which derives a minimum interpolation area by which the mesh connected body is corrected into a rectangle.

Figure 4:
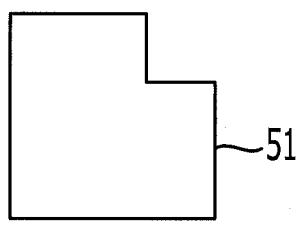
FIG. 4 is a diagram for explaining a method of correcting a mesh connected body.
Figure 4:
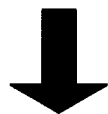
Figure 4:
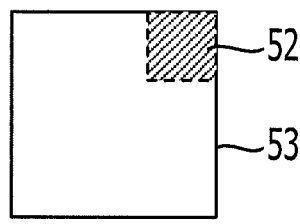

FIG. 4 is a diagram for explaining a method of correcting the mesh connected body. Reference numeral 51 shown in FIG. 4 denotes a mesh connected body before correction. Reference numeral 52 shown in FIG. 4 denotes an interpolation area. Reference numeral 53 shown in FIG. 4 denotes a mesh connected body after correction. As shown in FIG. 4, the high frequency change area identification unit 14d corrects the mesh connected body into the rectangle 53 by adding the interpolation area 52 to the mesh connected body 51. At this stage, the synthesis of the rectangle described below is not completed, and the rectangle 53 is not yet determined to be a high frequency change area, so the corrected rectangle is referred to as a candidate of a high frequency change area.

If there are pluralities of candidates of high frequency change areas, the high frequency change area identification unit 14d synthesizes a rectangle including a plurality of candidates of high frequency change areas, the distances between which are smaller than a predetermined value. The distance between the candidates of high frequency change areas mentioned above is a minimum distance between the corrected rectangles. As an example, when the high frequency change area identification unit 14d synthesizes a rectangle from the candidates of high frequency change areas, the high frequency change area identification unit 14d derives an interpolation area that is interpolated in a space between the candidates and adds the interpolation area to the candidates of high frequency change areas to synthesize a rectangle including the candidates of high frequency change areas. To derive the interpolation area, an algorithm is used which derives a minimum interpolation area by which the candidates of high frequency change areas are formed into a synthesized body.

Figure 5:
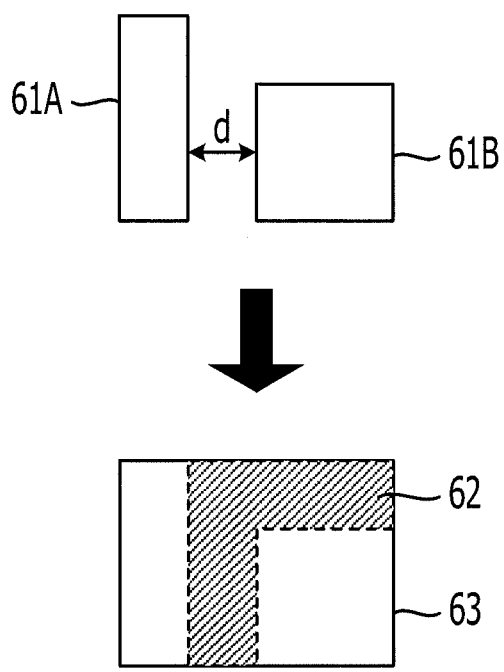
FIG. 5 is a diagram for explaining a method of synthesizing candidates of high frequency change areas.

FIG. 5 is a diagram for explaining a method of synthesizing the candidates of high frequency change areas. Reference numerals 61A and 61B shown in FIG. 5 denote the candidates of high frequency change areas. Reference numeral 62 shown in FIG. 5 denotes an interpolation area. Reference numeral 63 shown in FIG. 5 denotes a synthesized body of the candidate of high frequency change area 61A and the candidate of high frequency change area 61B. As shown in FIG. 5, when the distance d between the candidate of high frequency change area 61A and the candidate of high frequency change area 61B is smaller than a predetermined distance, the high frequency change area identification unit 14d adds the interpolation area 62. Thereby, the high frequency change area identification unit 14*d* synthesizes the synthesized body 63 including the candidate of high frequency change area 61A and the candidate of high frequency change area 61B. Then, the high frequency change area identification unit 14*d* identifies the synthesized body obtained in this way as a high frequency change area.

When the high frequency change area identification unit 14*d* identifies the high frequency change area in this way, the high frequency change area identification unit 14*d* outputs attribute information which can specify the position and the size of the high frequency change area to the attribute information transmission unit 14*h* described below. When the attribute information transmission unit 14*h* notifies the client terminal 20 of the attribute information of the high frequency change area, the client terminal 20 displays a blank area at a position corresponding to the high frequency change area in the bitmap data on the desktop screen displayed in the client terminal 20. Thereafter, the high frequency change area identification unit 14*d* clears the number of changes of the meshes mapped in the internal work memory. The high frequency change area identification unit 14*d* registers the attribute information of the high frequency change area in the internal work memory.

Each time an update rectangle is generated by the screen generation unit 14*b*, the high frequency change area identification unit 14*d* determines whether or not the update rectangle is included in the high frequency change area stored in the internal work memory, in other words, whether or not the update rectangle is included in an area from which a moving image is being transmitted by the second image transmission unit 14*g* described below. At this time, if the update rectangle is not included in the high frequency change area, the high frequency change area identification unit 14*d* causes the first image transmission unit 14*f* described below to transmit the image and the attribute information of the update rectangle. On the other hand, if the update rectangle is included in the high frequency change area, in principle, the high frequency change area identification unit 14*d* does not cause the first image transmission unit 14*f* described below to transmit the image and the attribute information of the update rectangle. If the update rectangle is an image drawn by the mouse via the OS execution control unit 11*a*, the image and the attribute information of the update rectangle drawn by the mouse may be exceptionally transmitted.

Each time bitmap data is drawn on the frame buffer 13, the high frequency change area identification unit 14*d* determines whether or not attribute information of a high frequency change area is registered in the internal work memory. If attribute information of a high frequency change area is registered, the high frequency change area identification unit 14*d* clips a bitmap image corresponding to the high frequency change area from the bitmap data drawn on the frame buffer 13, and then outputs the clipped bitmap image to the encoder 14*e* described below.

The encoder 14*e* is a processing unit for encoding an image. An example is a case in which the encoder 14*e* encodes an image of a high frequency change area inputted from the high frequency change area identification unit 14*d*. In this case, when the bitmap image of the high frequency change area inputted from the high frequency change area identification unit 14*d* reaches the number of frames that can form a stream, the encoder 14*e* encodes the bitmap image of the high frequency change area. Examples of the encoding method include MPEG methods such as MPEG-2 and MPEG-4 and a Motion-JPEG method.

The first image transmission unit 14*f* is a processing unit for transmitting the image and the attribute information of the update rectangle generated by the screen generation unit 14*b* to the client terminal 20. For example, an RFB protocol of VNC is used as a communication protocol for transmitting the update rectangle.

The second image transmission unit 14*g* is a processing unit for transmitting an encoded image that is encoded by the encoder 14*e* to the client terminal 20. For example, RTP (Real-time Transport Protocol) can be used as a communication protocol for transmitting the encoded image.

The attribute information transmission unit 14*h* is a processing unit for transmitting attribute information of an image to the client terminal 20. As an example, when a high frequency change area is identified by the high frequency change area identification unit 14*d*, the attribute information transmission unit 14*h* transmits attribute information which can specify the position and the size of the high frequency change area to the client terminal 20. Thereby the client terminal 20 displays a blank area at a position corresponding to the high frequency change area in the bitmap data on the desktop screen displayed in the client terminal 20.

Figure 6A:
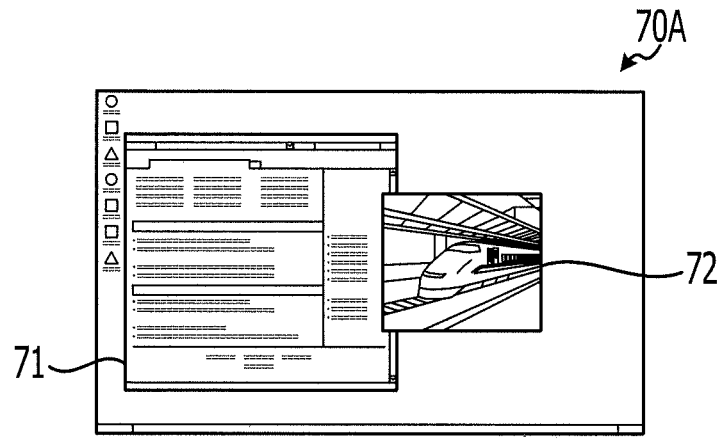
FIG. 6A is a diagram for explaining a notification method of attribute information of a high frequency change area.
Figure 6B:
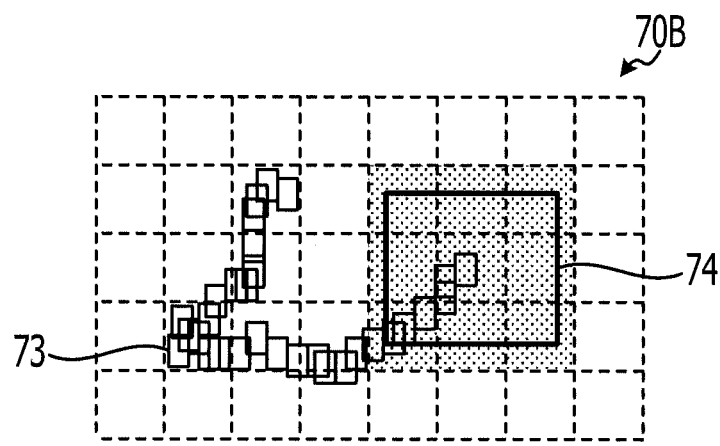
FIG. 6B is a diagram for explaining a notification method of attribute information of a high frequency change area.
Figure 6C:
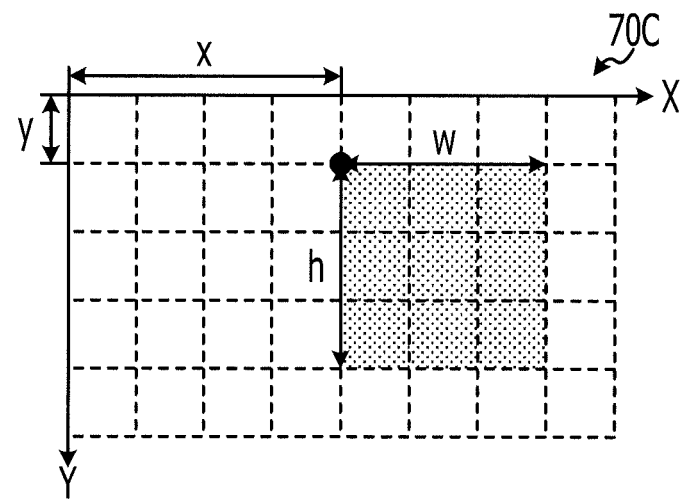
FIG. 6C is a diagram for explaining a notification method of attribute information of a high frequency change area.

FIGS. 6A to 6C are diagrams for explaining a notification method of attribute information of a high frequency change area. Reference numeral 70A shown in FIG. 6A denotes an example of a desktop screen drawn on the frame buffer 13. Reference numerals 70B and 70C shown in FIGS. 6B and 6C denote a map for determining the frequency of changes. Reference numeral 71 shown in FIG. 6A denotes a browser screen. Reference numeral 72 shown in FIG. 6A denotes a moving image reproduction screen. Reference numeral 73 shown in FIG. 6B denotes a trace of the mouse movement. Reference numeral 74 shown in FIG. 6B denotes a moving image reproduction area reproduced by an application.

As shown in FIG. 6A, the desktop screen 70A includes the browser screen 71 and the moving image reproduction screen 72. When tracing the changes over time from the desktop screen 70A, as shown in FIG. 6B, an update rectangle of the browser screen 71 which is a still image is not detected and the trace of the mouse movement 73 and an update rectangle related to the moving image reproduction area 74 are detected. Among them, meshes in which the number of changes exceeds the threshold value in the moving image reproduction area 74, that is, the shaded portions in FIG. 6B are assumed to be detected by the high frequency change area identification unit 14*d*. In this case, the attribute information transmission unit 14*h* transmits the coordinates (x, y) of the upper left vertex of the high frequency change area of the shaded portion shown in FIG. 6C and the width w and the height h of the high frequency change area to the client terminal 20 as the attribute information of the high frequency change area. Here, a case is described in which the coordinates of the upper left vertex is used as a point that specifies the position of the high frequency change area. However, the other vertexes may be used. Further, any point other than the vertexes, such as, for example, the center of gravity may be used if the point can specify the position of the high frequency change area. Here, a case is described in which an upper left point in the screen is used as the origin of the coordinate axes X and Y. However, any point inside the screen or outside the screen may be used as the origin.

In this way, the server device 10 identifies an area where a moving image compression method is used as a high frequency change area without depending on a specific application. Further, regarding areas other than the high frequency change area, the server device 10 transmits images of changed portions, and regarding the high frequency change area, the server device 10 compresses an image corresponding to the high frequency change area into data compressed by a moving image compression method. Therefore, in the server device 10, while it is possible to reduce the amount of data of images that mainly deteriorate operation response among the images transmitted to the client terminal 20, it is possible to minimize the loads of the encoder that performs compression processing and the decoder that performs decompression processing on the terminal device side. Therefore, in the server device 10, it is possible to improve operation response while maintaining the general versatility of the thin client.

However, the server device 10 needs some time to identify the high frequency change area. Therefore, even when an image in which changes between frames are intense is drawn on the frame buffer 13, if the changes occur in a short period of time, the server device 10 cannot identify the area where the changes occur as the high frequency change area.

Figure 7:
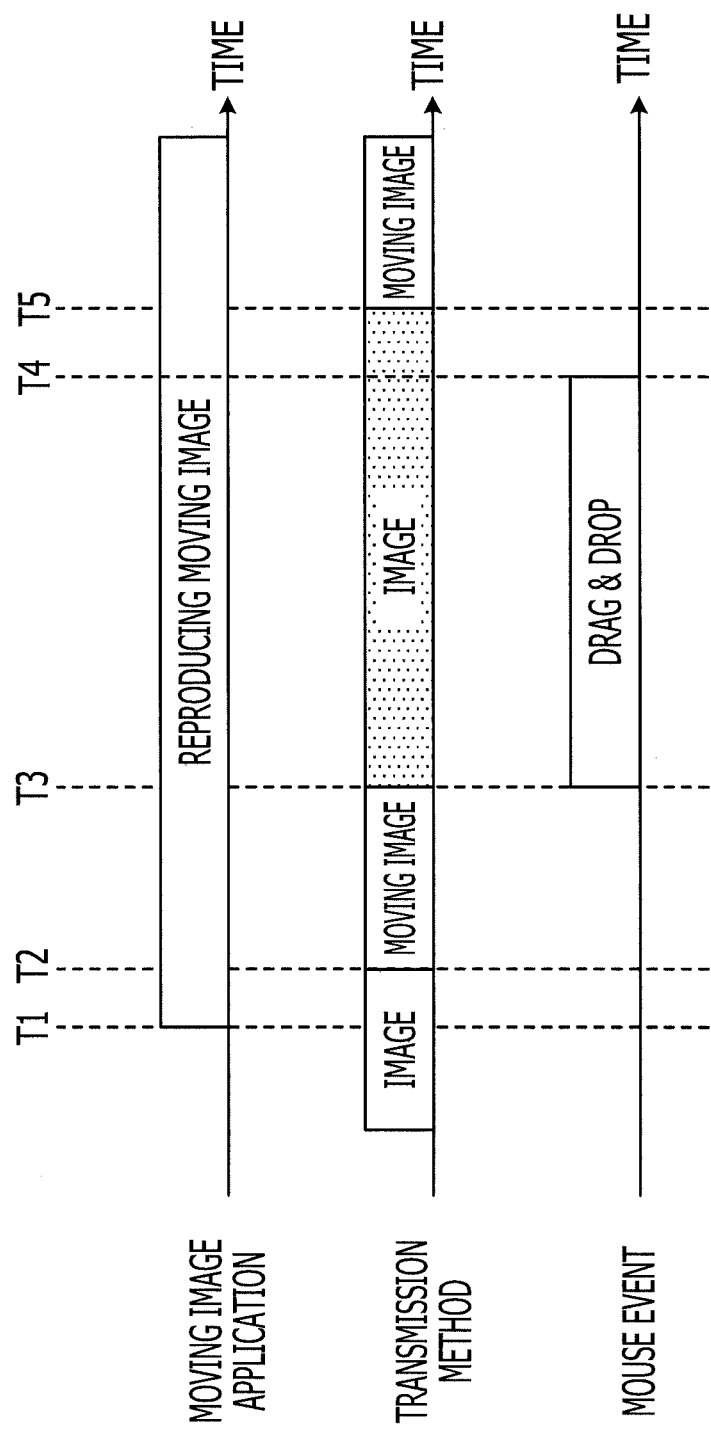
FIG. 7 is a diagram showing an example of a transmission method of an image transmitted from a server device to a client terminal when a window moves.

For example, when a window is moved, there may be a case in which the server device 10 cannot follow the movement of the window and a moving image cannot be displayed smoothly in the client terminal 20. FIG. 7 is a diagram showing an example of a transmission method of an image transmitted from the server device to the client terminal when a window moves. In the example of FIG. 7, a case is assumed in which, when a moving image application reproduces a moving image, a title bar of the window is dragged and dropped.

As shown in FIG. 7, since the window is at rest until the moving image is reproduced by the moving image application, changed portions between frames are transmitted as an image of update rectangle from the server device 10 to the client terminal 20. Then, at time T1, the reproduction of the moving image is started by the moving image application. Thereafter, at time T2, the window is identified as a high frequency change area by the server device 10, and the image in the window is started to be transmitted to the client terminal 20 as a moving image.

However, at time T3, the title bar of the window is started to be moved by a drag-and-drop operation. Thereby, a portion with intense movements moves along with the movement of the window, so a large number of images of update rectangles are generated temporarily and the amount of processing for determining the high frequency change area increases. Therefore, it takes some time to determine the high frequency change area. As a result, a state in which the window is not identified as the high frequency change area continues even though the moving image is being reproduced. Thereafter, even when the movement of the window is stopped at time T4, the window is not identified as the high frequency change area until time T5. Eventually, at time T5, the window is identified as the high frequency change area by the server device 10, and the image in the window is started to be transmitted to the client terminal 20 as a moving image.

In this way, when the window is moved, the moving image reproduced by the moving image application is transmitted to the client terminal 20 as a large number of update rectangles over a time period shown by the shaded portion. Therefore, the amount of transmission data increases significantly and it takes some time to complete the data transmission, so the operation response deteriorates.

To cope with the movement of the window, the server device 10 according to this embodiment generates a copy event to follow the movement of the window. Here, the copy event indicates an event for moving a copy area that is assumed to be a pseudo window along the trace of a mouse when the actual window is moved and thereby causing the copy area to follow the movement of the window.

Specifically, the server device 10 according to this embodiment transmits attribute information which can specify the position and the size of the copy area that follows the movement of the window to the client terminal 20 and also transmits the image drawn in the copy area on the frame buffer 13 by converting the image into a moving image.

Thereby it is possible to compress the image with intense movements in the copy area without generating a large number of update rectangles and transmit the image to the client terminal 20, so the operation response when the window moves is improved. On the other hand, if the client terminal 20 displays the moving images received from the server device 10 in an order of reception, the moving images are not necessarily displayed at the position of the copy area drawn on the frame buffer 13, so unnatural images are displayed.

Therefore, when the server device 10 according to this embodiment transmits a portion which is frequently changed on the frame buffer 13 as a moving image, the server device 10 adds synchronization information that associates the attribute information of the copy area and the moving image with each other to the attribute information and the moving image respectively, and then transmits the attribute information and the moving image to the client terminal 20. Thereby, the server device 10 according to this embodiment can display the moving image data in synchronization with the display position of the moving image in the client terminal 20. Therefore, according to the server device 10 according to this embodiment, it is possible to smoothly display a moving image even when the window moves.

Return to the description of FIG. 1. The copy event control unit 14k that realizes the copy event and the synchronization processing will be described. The copy event control unit 14k is a processing unit for controlling the generation, execution, and completion of the copy event.

A trigger for generating the copy event will be descried. The copy event control unit 14k determines the size of the high frequency change area identified by the high frequency change area identification unit 14d, for example, determines whether or not the size is greater than or equal to 50×50 pixels. If the high frequency change area is greater than or equal to a predetermined size, the copy event control unit 14k further determines whether or not a specific mouse event is detected, for example, determines whether or not a drag-and-drop operation is obtained by the operation information acquisition unit 14a. If the specific mouse event is detected, the copy event control unit 14k generates the copy event. Although, here, a case is described in which whether or not the copy event should be generated is determined based on a mouse event, it is possible to determine whether or not the copy event should be generated based on an operation of tablet or keyboard.

When there is a high frequency change area greater than or equal to a certain size, the probability that a window including a moving image is drawn on the frame buffer 13 increases. In such a situation, if an operation to move a window is obtained, it can be presumed that an operation to move a window including a moving image is performed. Therefore, it is possible to generate the copy event at an appropriate timing without collecting any specific information from the OS.

Next, a trigger for completing the copy event will be descried. The copy event control unit 14k determines whether or not a specific mouse event is detected. If the specific mouse event is stopped to be detected, that is to say, when the moving operation of the window is completed, the copy event control unit 14k completes the copy event. When the moving operation of the window is completed, operation information indicating that left-click included in the drag operation is released is obtained by the operation information acquisition unit 14a described below. It can be said that the moving operation of the window is completed if an update rectangle of the mouse cursor is not notified for a predetermined period of time.

Next, a processing content performed in the copy event will be descried. Each time the amount of movement of the mouse is obtained by the operation information acquisition unit 14a, the copy event control unit 14k increments by one the update counter 14m that counts the number of updates of the copy area. Then, the copy event control unit 14k calculates the position of the copy area of the current update count from the position of the copy area of the update count previous to the current update count and the amount of movement of the mouse obtained at the current update count. Regarding the position and size of the copy area, in the same manner as those of the high frequency change area, the position is determined by the coordinates of the upper left vertex and the size is determined by the width w and the height h of the high frequency change area.

Figure 8:
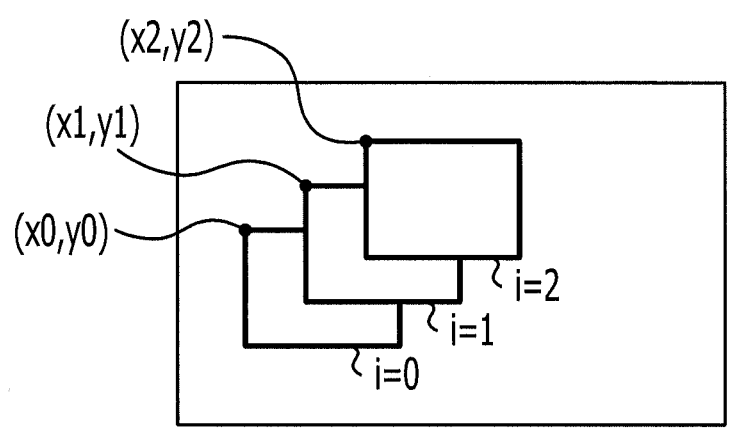
FIG. 8 is a diagram for explaining a method of calculating a position of a copy area.

FIG. 8 is a diagram for explaining a method of calculating the position of the copy area. The area of "i=0" shown in FIG. 8 is a copy area where the update count is "0" and has the same attribute information as that of the high frequency change area when the copy event is generated, that is, the attribute information including the coordinates (x0, y0) of the upper left vertex and the width w and the height h of the high frequency change area. The area of "i=1" shown in FIG. 8 is a copy area where the update count is "1". The area of "i=2" shown in FIG. 8 is a copy area where the update count is "2".

For example, regarding the position of the copy area where the update count is "1" shown in FIG. 8, the coordinates of the upper left vertex are calculated to be (x1, y1) by adding the amount of movement of the mouse obtained at the update count "1" to the coordinates (x0, y0) of the copy area where the update count is "0". For example, regarding the position of the copy area where the update count is "2" shown in FIG. 8, the coordinates of the upper left vertex are calculated to be (x2, y2) by adding the amount of movement of the mouse obtained at the update count "2" to the coordinates (x1, y1) of the copy area where the update count is "1". Regarding the width and the height of the copy area, the width w and the height h of the high frequency change area are inherited between the copy areas of each update count.

After the attribute information of the copy area is calculated in this way, the copy event control unit 14k outputs the attribute information and the update count of the copy area to the attribute information transmission unit 14h. The attribute information and the update count of the copy area are transmitted to the client terminal 20 by the attribute information transmission unit 14h.

The copy event control unit 14k also outputs the attribute information and the update count of the copy area to the encoder 14e. Then, from the bitmap image drawn on the frame buffer 13, an image of the position and the size corresponding to the copy area is sequentially encoded by the encoder 14e. At this time, a header indicating the update count is added to an encoded moving image frame. Thereafter, the moving image frame including the update count is transmitted to the client terminal 20 by the second image transmission unit 14g.

Various integrated circuits and electronic circuits can be used for the OS execution control unit 11a, the application execution control unit 11b, the graphic driver 12, and the server side remote screen control unit 14. A part of functional units included in the server side remote screen control unit 14 can be another integrated circuit or electronic circuit. Examples of the integrated circuit include ASIC (Application Specific Integrated Circuit) and FPGA (Field Programmable Gate Array). Examples of the electronic circuit include CPU (Central Processing Unit) and MPU (Micro Processing Unit).

Next, a configuration of the client terminal according to this embodiment will be described. As shown in FIG. 1, the client terminal 20 has an input unit 21, a display unit 22, and a client side remote screen control unit 23. In the example of FIG. 1, the client terminal 20 also has functional units included an ordinary computer, such as, for example, an audio output unit in addition to the functional units shown in FIG. 1.

The input unit 21 is an input device for receiving various information, for example, an input instruction to the client side remote screen control unit 23 described below. As an example, a keyboard and a mouse can be used as the input unit 21. The display unit 22 described below realizes a pointing device function in cooperation with the mouse.

The display unit 22 is a display device for displaying various information, for example, a desktop screen transmitted from the server device 10. As an example, a monitor, a display, a touch panel, and the like can be used as the display unit 22.

The client side remote screen control unit 23 is a processing unit for receiving a remote screen control service of the server device 10 through the client side remote screen control application. As shown in FIG. 1, the client side remote screen control unit 23 has an operation information notification unit 23a, a first image reception unit 23b, a first display control unit 23c, a second image reception unit 23d, a decoder 23e, and a second display control unit 23f.

The operation information notification unit 23a is a processing unit for notifying the server device 10 of operation information from the input unit 21. As an example, the operation information notification unit 23a notifies a position and a moving amount of the mouse cursor obtained via left or right click of the mouse, double click, drag, and a movement operation of the mouse as the operation information. As another example, the operation information notification unit 23a notifies a rotation amount of a mouse wheel and a type of a pressed key in the keyboard as the operation information.

The first image reception unit 23b is a processing unit for receiving the image and the attribute information of the update rectangle transmitted by the first image transmission unit 14f of the server device 10. The first image reception unit 23b also receives the attribute information of the high frequency change area and the attribute information and the update count of the copy area transmitted from the attribute information transmission unit 14h of the serve device 10.

The first display control unit 23c is a processing unit for causing the display unit 22 to display the image of the update rectangle received by the first image reception unit 23b. As an example, the first display control unit 23c causes the display unit 22 to display bitmap image of the update rectangle in a display area of the display unit 22 corresponding to the position and the size included in the attribute information of the update rectangle received by the first image reception unit 23b.

As another example, the first display control unit 23c performs the processing described below when the attribute information of the high frequency change area is received by the first image reception unit 23b. The first display control unit 23c defines a screen area of the display unit 22 corresponding to the position and the size of the high frequency change area included in the attribute information of the high frequency change area as a blank area in which bitmap image is not displayed.

As a further example, the first display control unit 23c performs synchronization processing so that a copy area having the same update count as that of a decoded image becomes a blank area when the attribute information and the update count of the copy area is received by the first image reception unit 23b.

The above processing will be described. The first display control unit 23c determines whether or not the second display control unit 23f holds the same update count as that of the currently received copy area. At this time, if the second display control unit 23f holds the same update count as that of the copy area, the first display control unit 23c waits until the first display control unit 23c is notified from the second display control unit 23f described below that the moving image of the previous update count has been reproduced. Thereafter, when the first display control unit 23c is notified from the second display control unit 23f described below that the decoded image of the previous update count has been reproduced, the first display control unit 23c defines a screen area of the display unit 22 corresponding to the position and the size included in the attribute information of the copy area as a blank area.

The second image reception unit 23d is a processing unit for receiving the encoded image of the high frequency change area or the copy area transmitted by the second image transmission unit 14g of the server device 10.

The decoder 23e is a processing unit for decoding the encoded image of the high frequency change area or the copy area received by the second image reception unit 23d. When the decoder 23e decodes the encoded image of the copy area, the decoder 23e outputs the update count added to the header to the second display control unit 23f along with the decode image. A decoder of a decoding method compatible with the encoding method implemented in the server device 10 is mounted in the decoder 23e.

The second display control unit 23f is a processing unit for displaying the decoded image that is decoded by the decoder 23e in a screen area of the display unit 22 specified by the attribute information of the high frequency change area or the copy area.

As an example, if the decoded image inputted from the decoder 23e is the decoded image of the high frequency change area, the second display control unit 23f displays the decoded image in a screen area of the display unit 22 which is defined as the blank area by the first display control unit 23c.

As another example, if the decoded image inputted from the decoder 23e is the decoded image of the copy area, the second display control unit 23f performs synchronization processing so that the decoded image of the same update count as that of the copy area is displayed.

The above processing will be described. When the update count of the decoded image inputted form the decoder 23e increases, the second display control unit 23f notifies the first display control unit 23c that the decoded image of the update count displayed so far in the blank area of the display unit 22 has been reproduced. Thereafter, the second display control unit 23f displays the decoded image of the update count that is incremented by one in a screen area of the display unit 22 which is defined as the blank area by the first display control unit 23c.

Figure 9:
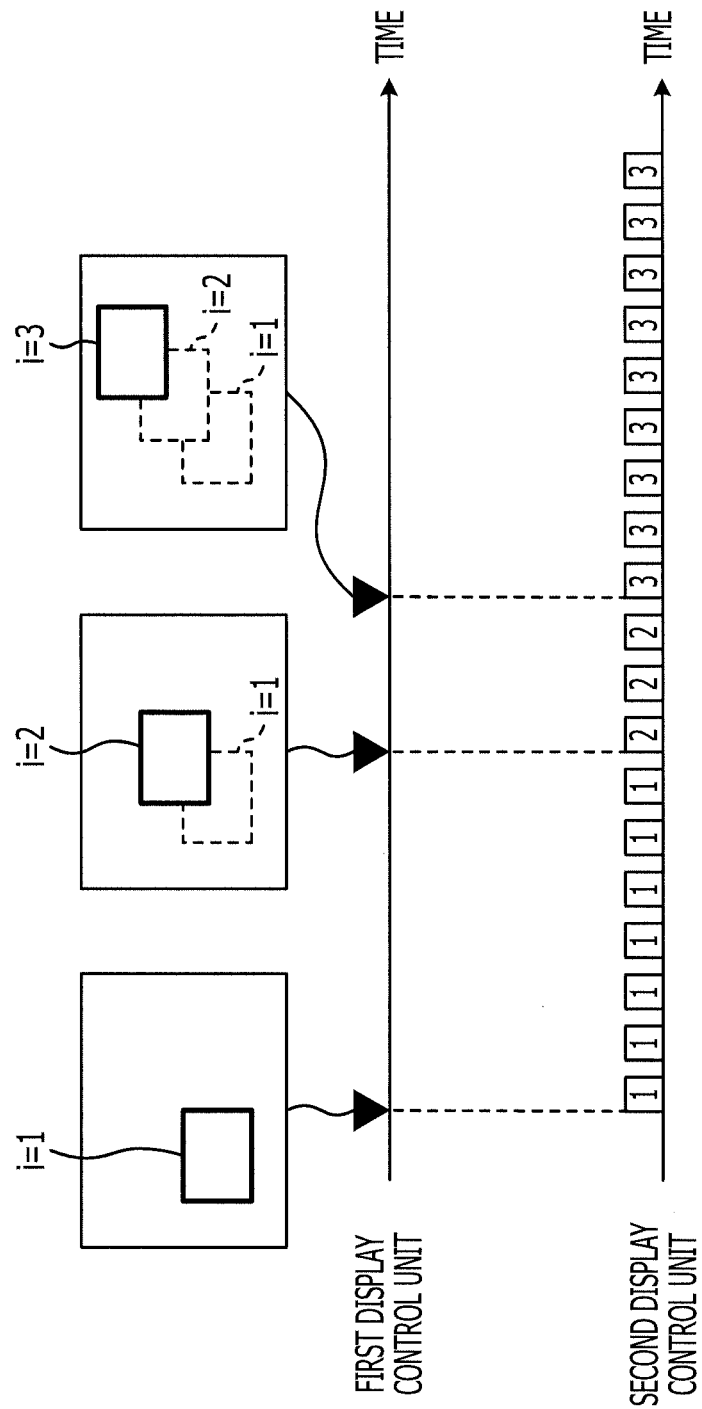
FIG. 9 is a diagram showing an aspect of synchronization control of a first display control unit and a second display control unit.

By the synchronization control of the first display control unit 23c and the second display control unit 23f, it is possible to synchronize the update of the blank area and the display of the decoded image with each other by the update count. FIG. 9 is a diagram showing an aspect of the synchronization control of the first display control unit and the second display control unit. As shown in FIG. 9, when the copy area of the update count "1" is defined as blank by the first display control unit 23c, only the seven decoded images in which the update count is "1" are displayed by the second display control unit 23f. The seven decoded images in which the update count is "1" are not displayed in the copy area of the update count "2". When the copy area of the update count "2" is defined as blank by the first display control unit 23c, only the three decoded images in which the update count is "2" are displayed by the second display control unit 23f. The three decoded images in which the update count is "2" are not displayed in the copy areas of the update count "1" and the update count "3". Further, when the copy area of the update count "3" is defined as blank by the first display control unit 23c, only the nine decoded images in which the update count is "3" are displayed by the second display control unit 23f. The nine decoded images in which the update count is "3" are not displayed in the copy areas of the update count "1" and the update count "2".

Various integrated circuits and electronic circuits can be used for the client side remote screen control unit 23. A part of functional units included in the client side remote screen control unit 23 can be another integrated circuit or electronic circuit. Examples of the integrated circuit include ASIC (Application Specific Integrated Circuit) and FPGA (Field Programmable Gate Array). Examples of the electronic circuit include CPU (Central Processing Unit) and MPU (Micro Processing Unit).

Figure 10:
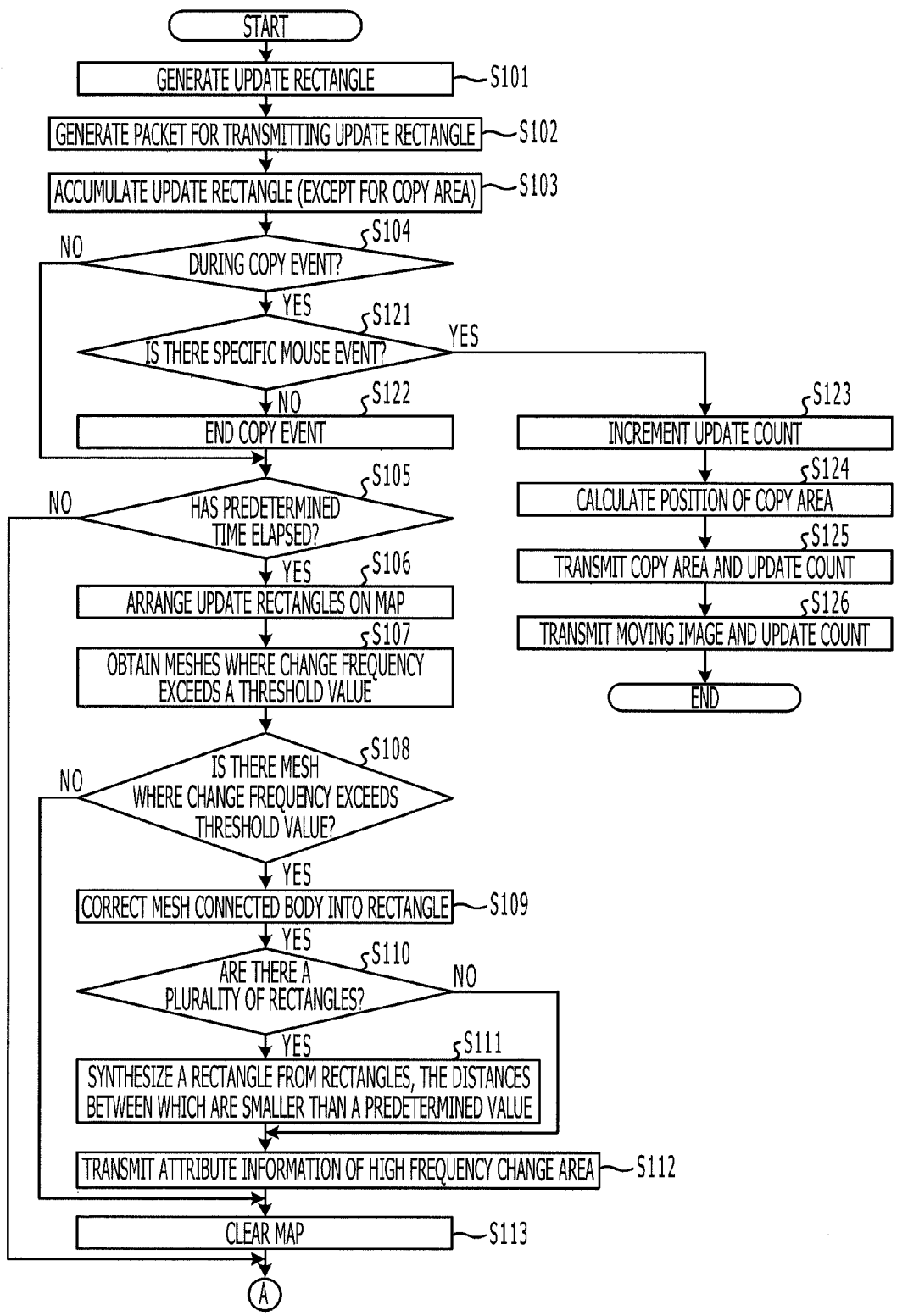
FIG. 10 is a flowchart showing a procedure of image transmission processing according to the first embodiment.
Figure 11:
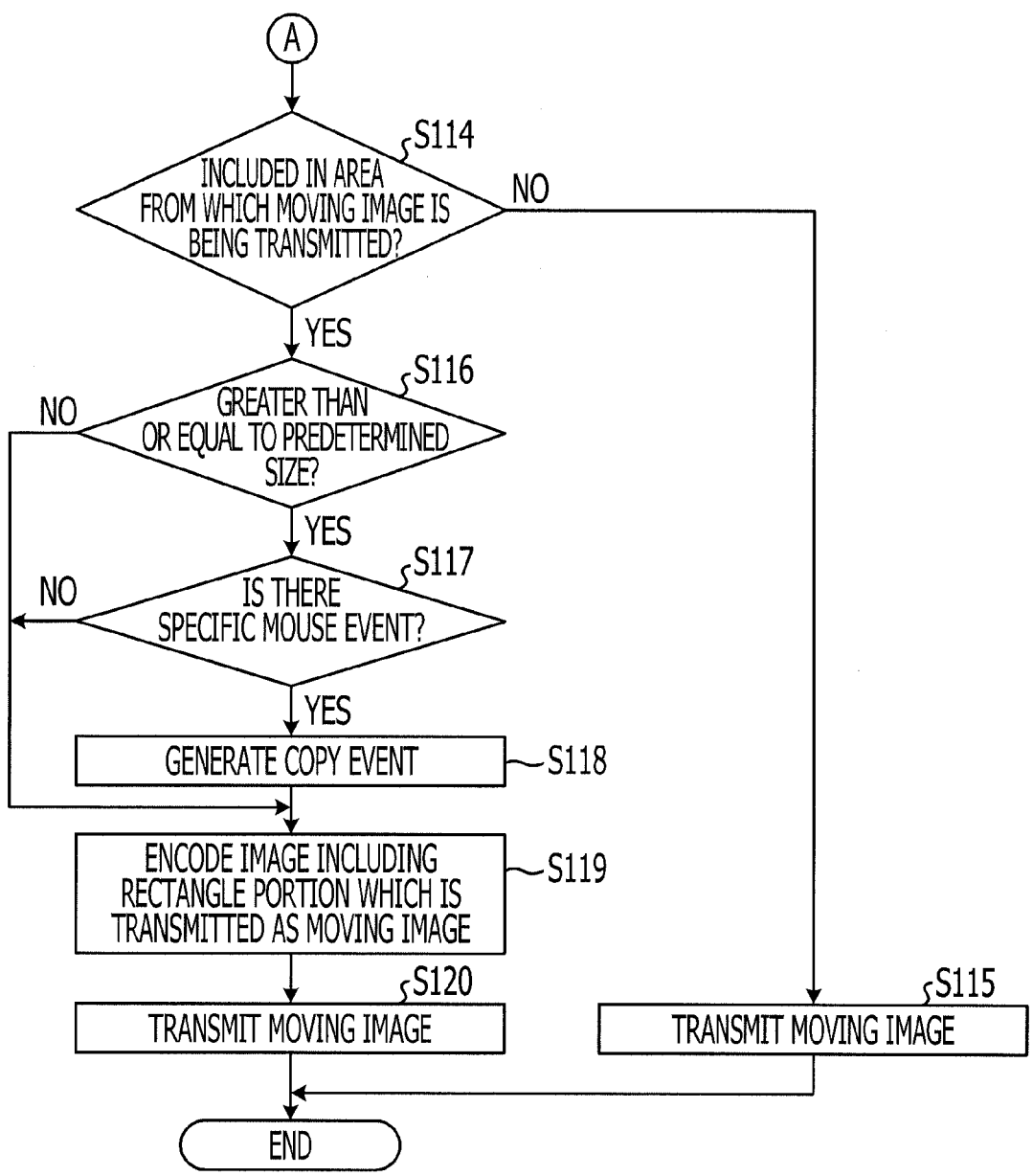
FIG. 11 is a flowchart showing a procedure of image transmission processing according to the first embodiment.

Next, a processing flow of the thin client system according to this embodiment will be described. FIGS. 10 and 11 are a flowchart showing a procedure of image transmission processing according to the first embodiment. The image transmission processing is performed by the server device 10, and started when bitmap data is drawn on the frame buffer 13.

As shown in FIG. 10, when bitmap data is drawn on the frame buffer 13, the screen generation unit 14b generates an image of an update rectangle by combining pixels of a portion changed from the previous frame and arranging the pixels into a rectangle (operation S101). Then, the screen generation unit 14b generates a packet for transmitting the update rectangle from the generated image of the update rectangle (operation S102).

Subsequently, the change frequency determination unit 14c accumulates the update rectangles generated by the screen generation unit 14b in an internal work memory not shown in the drawings (operation S103). Update rectangles of the copy areas are not accumulated in the internal work memory in order to reduce the amount of processing related to identifying the high frequency change area.

If the update rectangle is not an update rectangle included in an area of a copy event (No in operation S104), the change frequency determination unit 14c determines whether or not a predetermined time has elapsed from when the update rectangles are started to be accumulated (operation S105).

At this time, if the predetermined time has not yet elapsed from when the update rectangles are started to be accumulated (No in operation S105), the process skips the following processing related to identifying the high frequency change area and moves to operation S114 described below.

On the other hand, if the predetermined time has elapsed from when the update rectangles are started to be accumulated (Yes in operation S105), the change frequency determination unit 14c performs the processing described below. The change frequency determination unit 14c sequentially arranges the images of the update rectangles on the map for determining the frequency of changes according to the position and the size of the update rectangles accumulated in the internal work memory (operation S106). Then, the change frequency determination unit 14c obtains meshes where the change frequency exceeds a threshold value from meshes included in the map for determining the frequency of changes (operation S107).

Thereafter, the high frequency change area identification unit 14d determines whether or not a mash where the change frequency exceeds the threshold value is obtained (operation S108). At this time, if there is no mesh where the change frequency exceeds the threshold value (No in operation S108), the process skips the following processing related to identifying the high frequency change area because there is no high frequency change area in the desktop screen, and the process moves to operation S113.

On the other hand, if there is a mesh where the change frequency exceeds the threshold value (Yes in operation S108), the high frequency change area identification unit 14d corrects a mesh connected body, in which adjacent meshes are connected to each other, into a rectangle (operation S109).

If there is a plurality of corrected rectangles, that is, candidates of high frequency change areas (Yes in operation S110), the high frequency change area identification unit 14d performs the processing described below. The high frequency change area identification unit 14d synthesizes a rectangle including a plurality of candidates of high frequency change areas, the distances between which are smaller than a predetermined value (operation S111). If there are not a plurality of candidates of high frequency change areas (No in operation S110), the high frequency change area identification unit 14d does not synthesize a rectangle, and the process moves to operation S112.

Subsequently, the high frequency change area identification unit 14d transmits attribute information which can specify the position and the size of the high frequency change area to the client terminal 20 (operation S112). Then, the high frequency change area identification unit 14d clears the number of changes of the meshes mapped in the internal work memory (operation S113).

Thereafter, the high frequency change area identification unit 14d determines whether or not the update rectangle generated by the screen generation unit 14b is included in the high frequency change area stored in the internal work memory, in other words, whether or not the update rectangle is included in an area from which a moving image is being transmitted by the second image transmission unit 14g (operation S114).

At this time, if the update rectangle is not included in the high frequency change area (No in operation S114), the first image transmission unit 14f transmits the image and the attribute information of the update rectangle to the client terminal 20 (operation S115) and ends the processing.

On the other hand, if the update rectangle is included in the high frequency change area (Yes in operation S114), the copy event control unit 14k determines whether or not the size of the high frequency change area is greater than or equal to a predetermined size (operation S116). If the size of the high frequency change area is smaller than the predetermined size (No in operation S116), the copy event control unit 14k does not generate a copy event and moves to operation S119.

At this time, if the size of the high frequency change area is greater than or equal to the predetermined size (Yes in operation S116), the copy event control unit 14k further determines whether or not a specific mouse event is detected (operation S117). If no specific mouse event is detected (No in operation S117), the copy event control unit 14k does not generate a copy event and moves to operation S119.

If a specific mouse event is detected (Yes in operation S117), the copy event control unit 14k generates a copy event (operation S118). The high frequency change area identification unit 14d clips a bitmap image corresponding to the high frequency change area from the bitmap data drawn on the frame buffer 13 and causes the encoder 14e to encode the bitmap image (operation S119). Then the high frequency change area identification unit 14d transmits the encoded image of the high frequency change area encoded by the encoder 14e to the client terminal 20 (operation S120) and ends the processing.

Return to the determination in operation S104. If the update rectangle is an update rectangle included in an area of a copy event (Yes in operation S104), the copy event control unit 14k determines whether or not a specific mouse event is detected (operation S121).

At this time, if no specific mouse event is detected (No in operation S121), the copy event control unit 14k ends the copy event (operation S122) and moves to operation S105.

On the other hand, if a specific mouse event is detected (Yes in operation S121), the copy event control unit 14k increments the update counter 14m that counts the number of updates of the copy area (operation S123).

Then, the copy event control unit 14k calculates the position of the copy area of the current update count from the position of the copy area of the update count previous to the current update count and the amount of movement of the mouse obtained at the current update count (operation S124).

Subsequently, the attribute information transmission unit 14h transmits the attribute information and the update count of the copy area to the client terminal 20 (operation S125). Then the second image transmission unit 14g transmits a moving image frame with an update count, in which the high frequency change area and the update count are encoded by the encoder 14e, to the client terminal 20 (operation S126) and ends the processing.

The processing related to identifying the high frequency change area from operation S105 to operation S113 described above can be performed as processing different from the flow shown in FIGS. 10 and 11. In this case, every time a predetermined time has elapsed from when the update rectangles are started to be accumulated, the processing is started.

The processing from operation S114 to operation S115 described above can be performed as processing different from the flow shown in FIGS. 10 and 11. In this case, every time an update rectangle is generated by the screen generation unit 14b, the processing is started.

The processing from operation S119 to operation S120 described above can be performed as processing different from the flow shown in FIGS. 10 and 11. In this case, every time bitmap data is drawn on the frame buffer 13, it is determined whether or not attribute information of a high frequency change area is registered in the internal work memory. At this time, if attribute information of a high frequency change area is registered, the processing is started.

As described above, when the server device 10 according to this embodiment transmits a portion which is frequently changed on the frame buffer 13 as a moving image, the server device 10 adds synchronization information that associates the attribute information of the copy area and the moving image with each other to the attribute information and the moving image respectively, and then transmits the attribute information and the moving image to the client terminal 20. Thereby, the server device 10 according to this embodiment can display the moving image data in synchronization with the display position of the moving image in the client terminal 20. Therefore, according to the server device 10 according to this embodiment, it is possible to smoothly display a moving image even when the window moves.

The server device 10 according to this embodiment detects the amount of operation from the operation information received from the client terminal 20. When an area where the frequency of changes exceeds a threshold value is obtained, the server device 10 according to this embodiment detects the area moved according to the amount of operation. Then the server device 10 according to this embodiment generates an update count when detecting the area. Therefore, according to the server device 10 according to this embodiment, it is possible to correctly synchronize the display position of the moving image and the moving image data with each other in the client terminal 20.

Although the embodiment of the disclosed apparatus has been described, the present invention may be implemented in various different forms in addition to the aforementioned embodiment. Therefore, other embodiments included in the present invention will be described below.

For example, in the first embodiment described above, although a case is described in which the high frequency change area identification unit 14d clears the map for determining the frequency of changes in a cycle of accumulating an update rectangle, the timing of clearing the map for determining the frequency of changes is not limited to this.

As an example, even after the frequency of changes in an area identified as a high frequency change area does not exceed the threshold value, the high frequency change area identification unit 14d may continuously identify the area as a high frequency change area for a predetermined period of time.

Figure 12A:
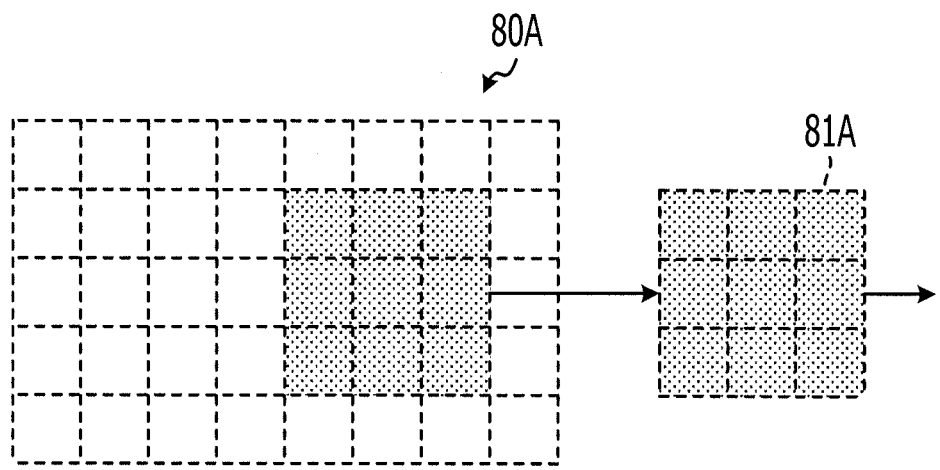
FIG. 12A is a diagram for explaining a method of extending timing of map clear.
Figure 12B:
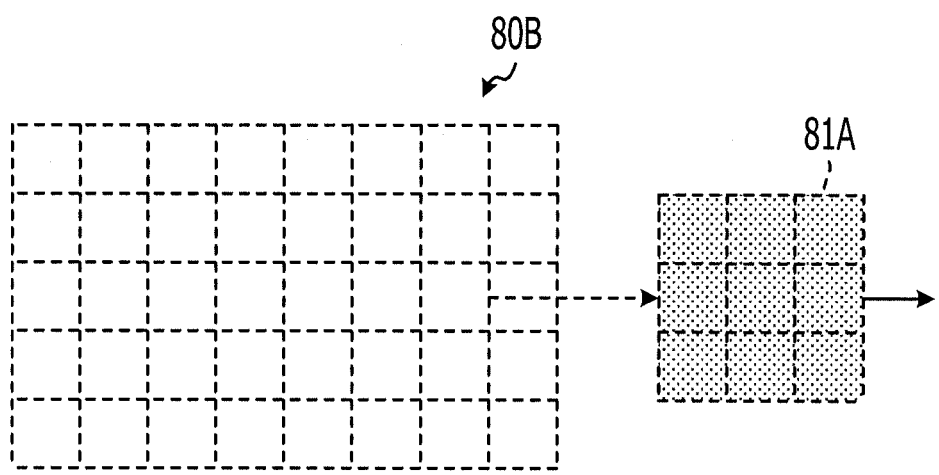
FIG. 12B is a diagram for explaining a method of extending timing of map clear.

FIGS. 12A and 12B are diagrams for explaining a method of extending timing of map clear. The example of FIG. 12A shows a map 80A for determining the frequency of changes at the time point when a high frequency change area is first detected and an identification result 81A of the high frequency change area at the time point. The example of FIG. 12B shows a map 80B for determining the frequency of changes at a specific time point in a predetermined period of time after the high frequency change area is first detected and an identification result 81A of the high frequency change area at the time point.

As shown in FIG. 12A, when a mesh connected body where the number of changes exceeds the threshold value is obtained in the map 80A and the identification result 81A of a high frequency change area is obtained, the identification result 81A is inherited for a predetermined period of time even if a mesh connected body where the number of changes exceeds the threshold value is not obtained thereafter. In other words, as shown in FIG. 12B, even if a mesh connected body where the number of changes exceeds the threshold value is not obtained in the map 80A, the identification result 81A of the high frequency change area is inherited in a predetermined period of time after the identification result 81A of the high frequency change area is first identified. The aforementioned "threshold value" can be selected by an end user from stepped values set by a developer of the server side remote screen control application, or can be directly set by an end user.

Thereby, even when motion intermittently disappears in an area where a moving image is actually reproduced, the high frequency change area is not intermittently identified. As a result, it is possible to prevent the frame from dropping intermittently in the high frequency change area. Further, by inheriting the identification result of the high frequency change area, the size of the high frequency change area becomes stable, so the frequency of initializing the parameters of encoding can be reduced. As a result, a load applied to the encoder can also be reduced.

As another example, when the area identified as a high frequency change area becomes smaller than the area previously identified as a high frequency change area, the high frequency change area identification unit 14d performs processing describe below. When the area reduction rate is smaller than or equal to a predetermined threshold value, the high frequency change area identification unit 14d inherits the area previously identified as a high frequency change area as the current identification result.

Figure 13A:
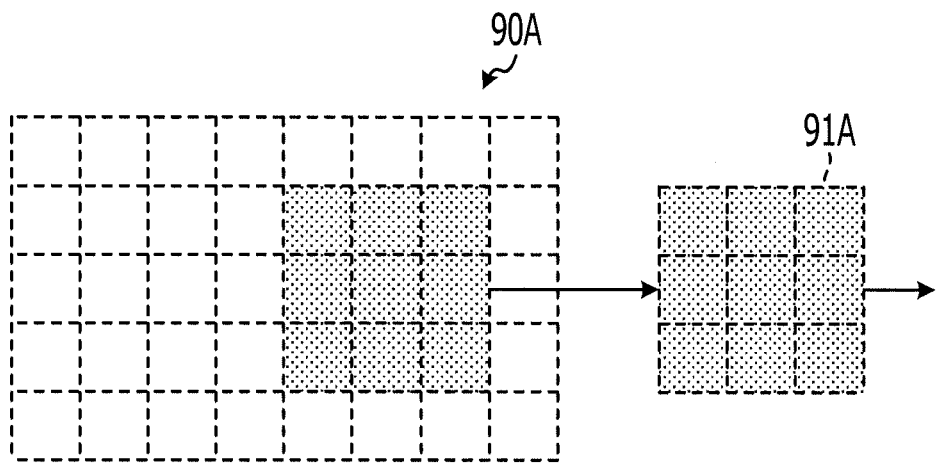
FIG. 13A is a diagram for explaining a suppression method with respect to reducing a high frequency change area.
Figure 13B:
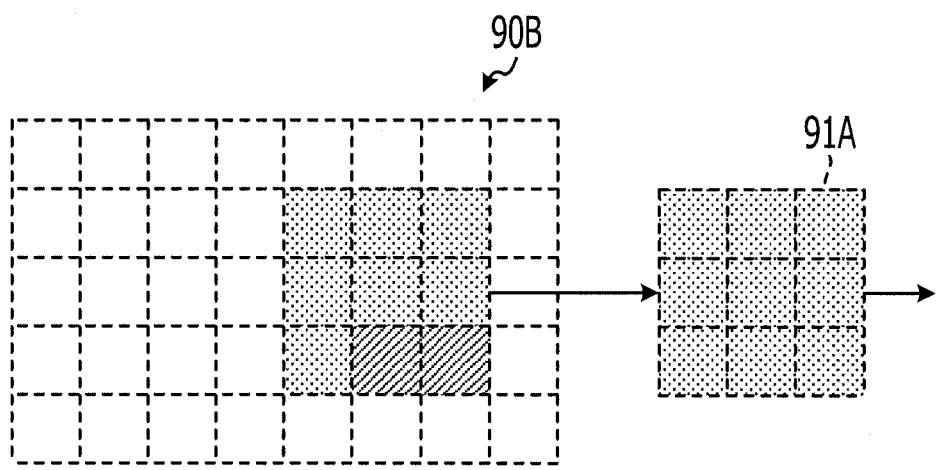
FIG. 13B is a diagram for explaining a suppression method with respect to reducing a high frequency change area.

FIGS. 13A and 13B are diagrams for explaining a suppression method with respect to reducing a high frequency change area. The example of FIG. 13A shows a map 90A for determining the frequency of changes and an identification result 91A of the high frequency change area at the time point T1. The example of FIG. 13B shows a map 90B for determining the frequency of changes and an identification result 91A of the high frequency change area at the time point T2. The relationship between the time points T1 and T2 is T1<T2.

As shown in FIG. 13A, when a mesh connected body where the number of changes exceeds the threshold value is obtained in the map 90A and the identification result 91A of a high frequency change area is obtained, even if the mesh connected body where the number of changes exceeds the threshold value is reduced after the time point T1, the high frequency change area is not reduced immediately. Specifically, as shown in FIG. 13B, even when the mesh connected body where the number of changes exceeds the threshold value is reduced by the shaded portion, if the reduced area is smaller than a predetermined threshold value which is, for example, one half, the identification result 91A of the high frequency change area is inherited.

Thereby, even when a part of motion intermittently appears in an area where a moving image is actually reproduced, the high frequency change area is not intermittently identified. As a result, it is possible to prevent the frame from dropping intermittently in the high frequency change area. Further, by inheriting the identification result of the high frequency change area, the size of the high frequency change area becomes stable, so the frequency of initializing the parameters of encoding can be reduced. As a result, a load applied to the encoder can also be reduced.

Although, in the first embodiment described above, a case is described in which the disclosed apparatus is applied when the window is moved, the disclosed apparatus is not limited to this. The disclosed apparatus can be also applied when the window is enlarged or reduced in addition to when the window is moved. In this case, the size in the attribute information of the copy area is not fixed, but changed according to the enlargement rate or the reduction rate.

The constituent elements of the devices shown the drawings need not necessarily be physically configured as shown in the drawings. In other words, specific forms of distribution and integration of the devices are not limited to those illustrated in the drawings, and all or part of the devices can be functionally or physically distributed or integrated in arbitrary units according to various loads and the state of use.

For example, the transmission processing performed by the first image transmission unit 14f and the second image transmission unit 14g of the server device 10 may be integrated into one image transmission unit. The reception processing performed by the first image reception unit 23b and the second image reception unit 23d of the client terminal 20 may be integrated into one image reception unit. Further, the display control processing performed by the first display control unit 23c and the second display control unit 23f of the client terminal 20 may be integrated into one display control unit.

The operation information acquisition unit 14*a*, the screen generation unit 14*b*, the change frequency determination unit 14*c*, the high frequency change area identification unit 14*d*, the encoder 14*e*, the first image transmission unit 14*f*, the second image transmission unit 14*g*, the attribute information transmission unit 14*h*, and the copy event control unit 14*k* may be configured as described below. As an example, these functional units may be connected to each other via a network as external devices of the server device 10. As another example, these functional units may be respectively included in different devices, and the devices may be connected to each other via a network and cooperate with each other to realize the function of the server device 10. Similarly, the operation information notification unit 23*a*, the first image reception unit 23*b*, the first display control unit 23*c*, the second image reception unit 23*d*, the decoder 23*e*, and the second display control unit 23*f* included in the client terminal 20 may be also configured as described above.

Figure 14:
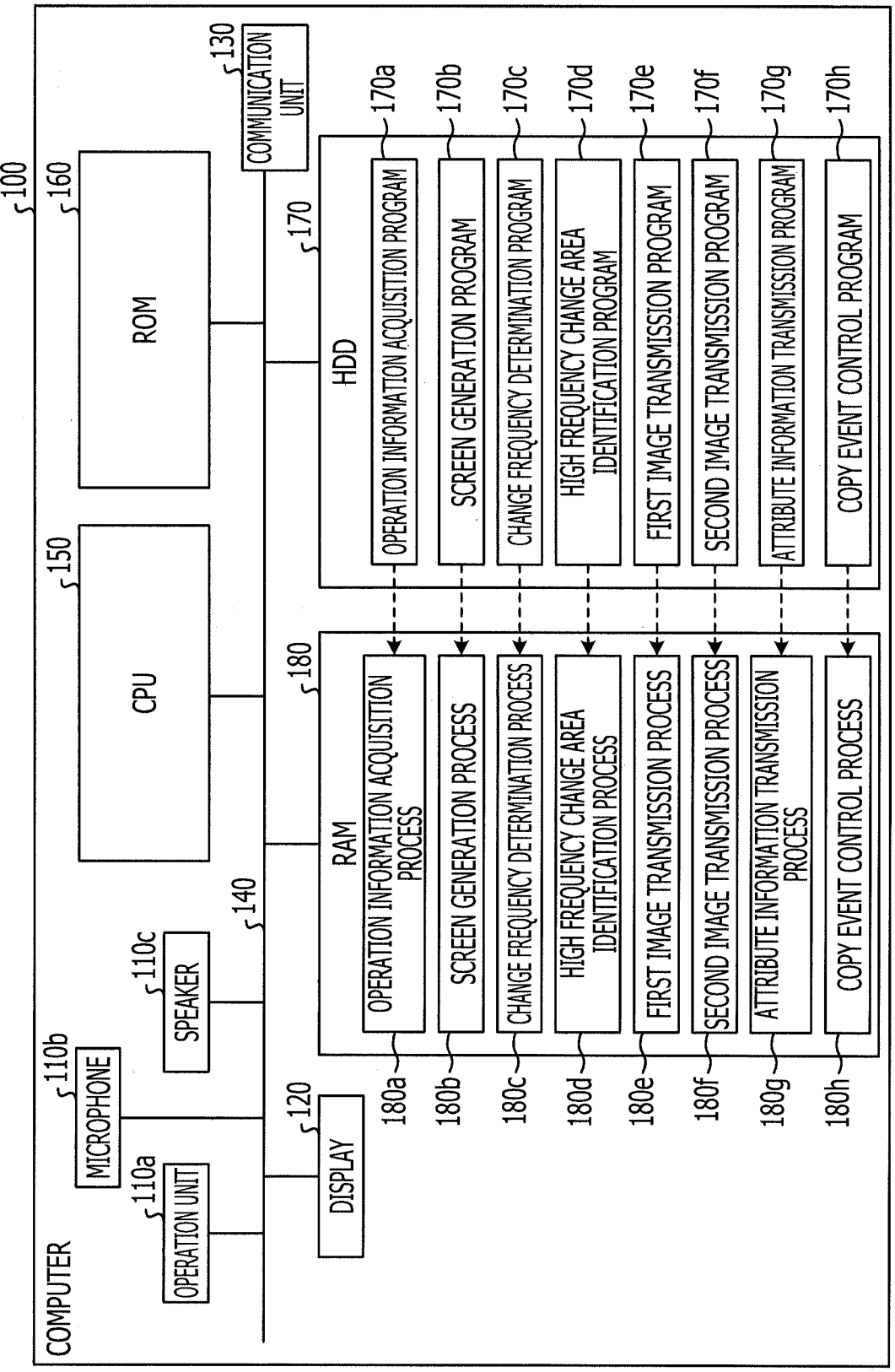
FIG. 14 is a diagram for explaining an example of a computer that executes an image transmission program according to a second embodiment.

Various processing described in the above embodiment can be realized by executing a program prepared in advance by a computer such as a personal computer or a workstation. Therefore, an example of a computer that executes an image transmission program having the same function as that of the above embodiment will be described below with reference to FIG. 14. FIG. 14 is a diagram for explaining an example of a computer that executes an image transmission program according to a second embodiment. Although, here, an example of a computer that executes an image transmission program having the same function as that of the server device 10 will be described, this is the same for a computer that executes an image display program having the same function as that of the client terminal 20.

As shown in FIG. 14, a computer 100 according to the second embodiment has an operation unit 110*a*, a microphone 110*b*, a speaker 110*c*, a display 120, and a communication unit 130. Further, the computer 100 has a CPU 150, a ROM 160, an HDD (Hard Disk Drive) 170, and a RAM (Random Access Memory) 180. These components 110 to 180 are connected to each other via a bus 140.

In the HDD 170, a control program that exerts the same functions as those of the operation information acquisition unit 14*a*, the screen generation unit 14*b*, and the change frequency determination unit 14*c* shown in the above-described first embodiment is stored in advance. Further, in the HDD 170, a control program that exerts the same functions as those of the high frequency change area identification unit 14*d*, the first image transmission unit 14*f*, the second image transmission unit 14*g*, the attribute information transmission unit 14*h*, and the copy event control unit 14*k* is stored in advance. Specifically, as shown in FIG. 14, in the HDD 170, an operation information acquisition program 170*a*, a screen generation program 170*b*, a change frequency determination program 170*c*, and a high frequency change area identification program 170*d* are stored. Further, in the HDD 170, a first image transmission program 170*e* and a second image transmission program 170*f* are stored. Further, in the HDD 170, an attribute information transmission program 170*g* and a copy event control program 170*h* are stored. These programs 170*a* to 170*h* may be appropriately integrated or separated in the same way as the constituent elements of the server device 10 shown in FIG. 1. Regarding the data that should be stored in the HDD 170, it is not necessary for all the data to be stored in the HDD 170, but only data necessary for processing has to be stored in the HDD 170.

The CPU 150 reads the programs 170*a* to 170*h* from the HDD 170 and stores the programs in the RAM 180. Thereby, as shown in FIG. 14, the programs 170*a* to 170*d* function as an operation information acquisition process 180*a*, a screen generation process 180*b*, a change frequency determination process 180*c*, and a high frequency change area identification process 180*d*. Further, the programs 170*e* and 170*f* function as a first image transmission process 180*e* and a second image transmission process 180*f*. Further, the programs 170*g* and 170*h* function as an attribute information transmission process 180*g* and a copy event control process 180*h*.

The processes 180*a* to 180*e* appropriately store various data such as image transmission data (not shown in the drawings) read from the HDD 170 in areas on the RAM 180 assigned to each process, and performs various processing on the basis of the stored various data. The processes 180*a* to 180*e* include, for example, processing performed by the server side remote screen control unit of the server device 10 shown in FIG. 1, for example, the processing shown in FIGS. 10 and 11. Regarding the processing sections that are virtually realized on the CPU 150, it is not necessary that all the processing sections operate on the CPU 150 at all times, but only processing sections necessary for processing have to be virtually realized.

The aforementioned image transmission program is not necessarily to be stored in the HDD 170 or the ROM 160 from the beginning. For example, the programs are stored in "portable physical media" such as a flexible disk (FD), a CD-ROM, a DVD disk, a magneto-optical disk, and an IC card that are inserted into the computer 100. The computer 100 may obtain the programs from the portable physical media and execute the programs. Or, the programs are stored in another computer or server device that is connected to the computer 100 through public lines, the Internet, LAN, WAN, or the like, and the computer 100 may obtain the programs from the computer or the server device and execute the programs.

Figure 15:
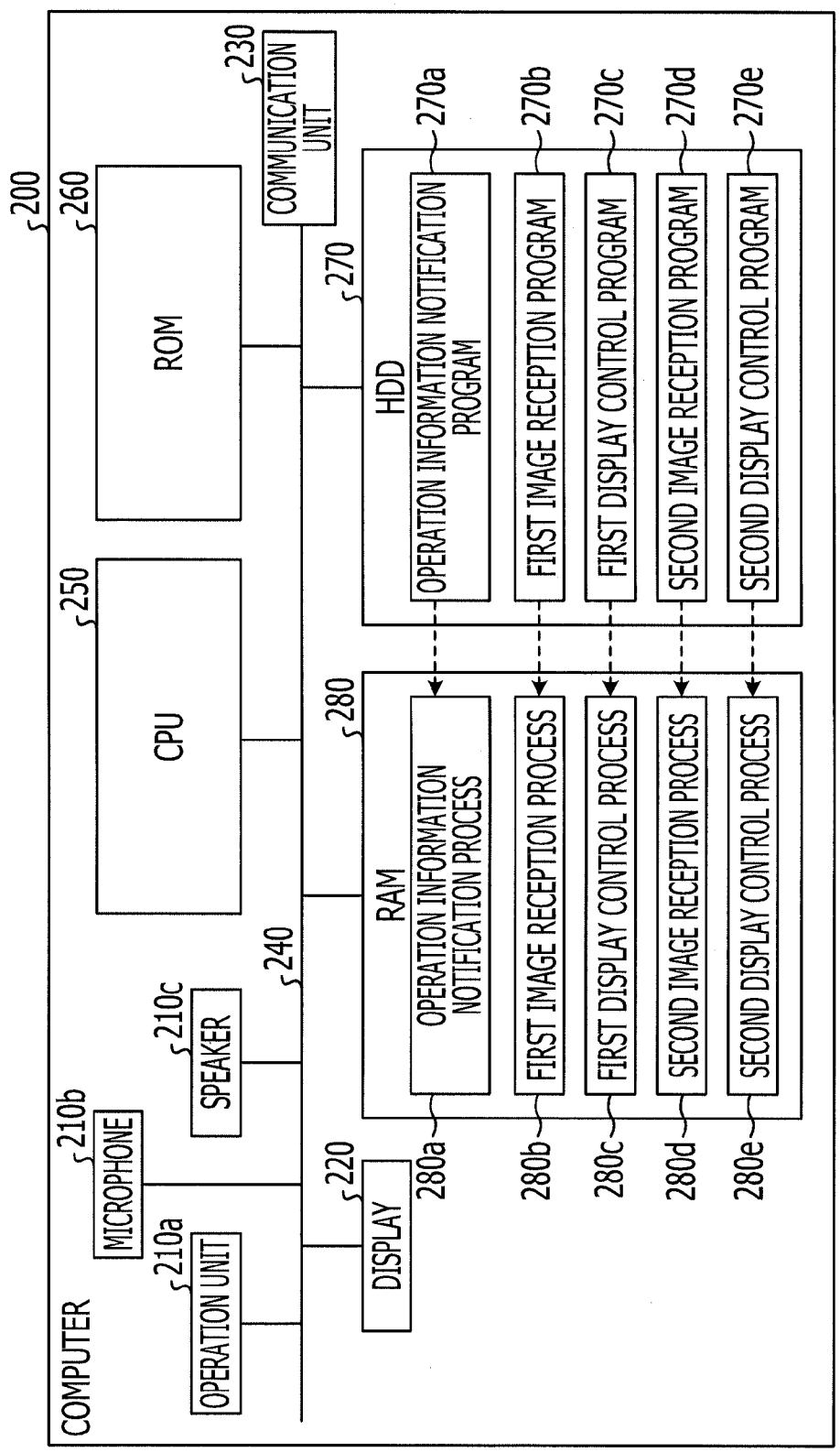
FIG. 15 is a diagram for explaining an example of a computer that executes an image display program according to the second embodiment.

In the above description, an example of a computer that executes the image transmission program having the same function as that of the server device 10 is described with reference to FIG. 14. Next, here, a case in which the image display program having the same function as that of the client terminal 20 is executed will be described with reference to FIG. 15. FIG. 15 is a diagram for explaining an example of a computer that executes the image display program according to the second embodiment.

As shown in FIG. 15, a computer 200 according to the second embodiment has an operation unit 210*a*, a microphone 210*b*, a speaker 210*c*, a display 220, and a communication unit 230. Further, the computer 200 has a CPU 250, a ROM 260, an HDD (Hard Disk Drive) 270, and a RAM (Random Access Memory) 280. These components 210 to 280 are connected to each other via a bus 240.

In the HDD 270, a control program that exerts the same functions as those of the operation information notification unit 23*a*, the first image reception unit 23*b*, the first display control unit 23*c*, the second image reception unit 23*d*, and the second display control unit 23*f* is stored in advance. Specifically, as shown in FIG. 15, in the HDD 270, an operation information notification program 270*a*, a first image reception program 270*b*, and a first display control program 270*c* are stored. Further, in the HDD 270, a second image reception program 270*d* and a second display control program 270*e* are stored. These programs 270*a* to 270*e* may be appropriately integrated or separated in the same way as the constituent elements of the client terminal 20 shown in FIG. 1. Regarding the data that should be stored in the HDD 270, it is not necessary for all the data to be stored in the HDD 270, but only data necessary for processing has to be stored in the HDD 270.

The CPU 250 reads the programs 270a to 270e from the HDD 270 and stores the programs in the RAM 280. Thereby, as shown in FIG. 15, the programs 270a to 270c function as an operation information notification process 280a, a first image reception process 280b, and a first display control process 280c. Further, the programs 270d and 270e function as a second image reception process 280d and a second display control process 280e.

The processes 280a to 280e appropriately store various data such as image display data (not shown in the drawings) read from the HDD 270 in areas on the RAM 280 assigned to each process, and performs various processing on the basis of the stored various data. The processes 280a to 280e include, for example, processing performed by the client side remote screen control unit of the client terminal 20 shown in FIG. 1. Regarding the processing sections that are virtually realized on the CPU 250, it is not necessary that all the processing sections operate on the CPU 250 at all times, but only processing sections necessary for processing have to be virtually realized.

The aforementioned image display program is not necessarily to be stored in the HDD 270 or the ROM 260 from the beginning. For example, the programs are stored in "portable physical media" such as a flexible disk (FD), a CD-ROM, a DVD disk, a magneto-optical disk, and an IC card that are inserted into the computer 200. The computer 200 may obtain the programs from the portable physical media and execute the programs. Or, the programs are stored in another computer or server device that is connected to the computer 200 through public lines, the Internet, LAN, WAN, or the like, and the computer 200 may obtain the programs from the computer or the server device and execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus for generating a plurality of images to be displayed on a display of a terminal device connected to the information processing apparatus via a network and transmitting the plurality of images to the terminal device, the apparatus comprising:
    an image memory configured to store the plurality of images; and
    a processor configured to execute a plurality of instructions, the instructions comprising:
        a first transmission instruction configured to transmit the plurality of images to the terminal device;
        an area determination instruction configured to determine an area in which frequency of change between frames of the plurality of images exceeds a threshold value;
        a second transmission instruction configured to compress the determined area at a frame rate higher than that of the first transmission instruction and transmitting the area to the terminal device; and
        a management instruction configured to manage synchronization between an image transmitted by the first transmission instruction and an image transmitted by the second transmission instruction, generate a drawing time of each image according to detection of a move of the area determined by the area determination instruction, and add the drawing time to the image transmitted by the first transmission instructions and the image transmitted by the second transmission instruction,
    wherein the drawing time is a time point when the frequency of change between frames exceeds the threshold and the drawing time includes information of a move destination position or a size of the area determined by the area determination instruction.

2. The apparatus according to claim 1, the instructions further comprising:
    a reception instruction configured to receive operation information of the terminal device;
    an operation amount detection instruction configured to detect an amount of operation from the operation information; and
    a moved area detection instruction configured to detect a moved area according to the amount of operation when an area in which the change exceeds the threshold value is obtained as a determination result of the area determination instruction,
    wherein the management instruction generates the drawing time when the moved area detection instruction detects a moved area.

3. The apparatus according to claim 1, wherein the area determination instruction divides the plurality of images into arbitrary areas and determines whether change between frames exceeds a threshold value for each divided area.

4. The apparatus according to claim 1, wherein the area determination instruction determines an area in which change between frames of the plurality of images exceeds a threshold value when a predetermined period of time has elapsed from when the plurality of images are stored in the image memory.

5. A non-transitory computer-readable storage medium storing an image transmission program of a computer for generating a plurality of images to be displayed on a display unit of a terminal device connected to the computer via a network and transmitting the plurality of images to the terminal device, the image transmission program causing the computer to execute a process comprising:
    a first transmission procedure of transmitting an image drawn on an image memory that stores a plurality of images drawing execution results of the computer to the terminal device;
    an area determination procedure of determining an area in which frequency of change between frames of the plurality of images exceeds a threshold value;
    a second transmission procedure of compressing the determined area at a frame rate higher than that of the first transmission procedure and transmitting the area to the terminal device; and
    a management procedure of managing synchronization between an image transmitted by the first transmission procedure and an image transmitted by the second transmission procedure, generating a drawing time of each image according to detection of a move of the area determined by the area determination procedure, and adding the drawing time to the image transmitted by the first transmission procedure and the image transmitted by the second transmission procedure,
    wherein the drawing time is a time point when the frequency of change between frames exceeds the threshold and the drawing time includes information of a move destination position or a size of the area determined by the area determination unit.

6. The non-transitory computer-readable storage medium according to claim 5, the program causing the computer to execute the process further comprising:
   a reception procedure of receiving operation information of the terminal device;
   an operation amount detection procedure of detecting an amount of operation from the operation information; and
   a moved area detection procedure of detecting a moved area according to the amount of operation when an area in which the change exceeds the threshold value is obtained as a determination result of the area determination procedure,
   wherein the management procedure generates the drawing time when the moved area detection unit detects a moved area.

7. The non-transitory computer-readable storage medium according to claim 5, wherein the area determination procedure divides the plurality of images into arbitrary areas and determines whether change between frames exceeds a threshold value for each divided area.

8. The non-transitory computer-readable storage medium according to claim 5, wherein the area determination procedure determines an area in which change between frames of the plurality of images exceeds a threshold value when a predetermined period of time has elapsed from when the images are stored in the image memory.

* * * * *